United States Patent
Leshner et al.

(10) Patent No.: US 11,961,142 B2
(45) Date of Patent: Apr. 16, 2024

(54) SYSTEMS AND METHODS FOR POOLING AND TRANSFERRING DIGITAL ASSETS

(71) Applicant: COMPOUND LABS, INC., San Francisco, CA (US)

(72) Inventors: Robert Leshner, San Francisco, CA (US); Geoffrey Hayes, San Francisco, CA (US); Jared Flatow, San Francisco, CA (US); Torrey Atcitty, San Francisco, CA (US); Coburn Berry, San Francisco, CA (US)

(73) Assignee: COMPOUND LABS, INC., San Francisco, CA (US)

( * ) Notice: Subject to any disclaimer, the term of this patent is extended or adjusted under 35 U.S.C. 154(b) by 0 days.

(21) Appl. No.: 16/551,632

(22) Filed: Aug. 26, 2019

(65) Prior Publication Data
US 2021/0065302 A1 Mar. 4, 2021

(51) Int. Cl.
*G06Q 40/06* (2012.01)
*G06Q 20/06* (2012.01)
(Continued)

(52) U.S. Cl.
CPC ......... *G06Q 40/06* (2013.01); *G06Q 20/0658* (2013.01); *G06Q 20/3672* (2013.01); *G06Q 40/02* (2013.01); *H04L 9/0637* (2013.01)

(58) Field of Classification Search
USPC .......................................................... 705/35
See application file for complete search history.

(56) References Cited

U.S. PATENT DOCUMENTS

| 10,275,772 B2 | 4/2019 | Ronca et al. |
| 2015/0170112 A1* | 6/2015 | DeCastro ............. G06Q 20/367 705/39 |

(Continued)

FOREIGN PATENT DOCUMENTS

| JP | 2019-519014 A | 7/2019 |
| WO | 2017/030086 A1 | 2/2017 |
| WO | 2019/035459 A1 | 2/2019 |

OTHER PUBLICATIONS

Ashley Lannquist, Today'sCrypto Asset Valuation Frameworks (Crypto Asset Valuation) 2018. (Year: 2018).*
(Continued)

*Primary Examiner* — Chikaodinaka Ojiaku
(74) *Attorney, Agent, or Firm* — Fenwick & West LLP

(57) ABSTRACT

The disclosed computer-implemented method for pooling and transferring digital assets may include detecting a transaction event for a blockchain ledger. The blockchain ledger may include transaction records for a pool of digital assets and accounts collectively owning the digital assets. Each account may own a proportional portion of the digital assets corresponding to an account asset balance. The method may also include calculating an exchange rate based on a cash balance of the pool, a liabilities balance of the pool, and an ownership distribution value. The ownership distribution value may be based on a distribution of the account asset balances. The method may also include updating the cash balance based on the exchange rate and the transaction event, and adding a transaction record for the transaction event to the plurality of transaction records. Various other methods, systems, and computer-readable media are also disclosed.

20 Claims, 12 Drawing Sheets

(51) Int. Cl.
  *G06Q 20/36* (2012.01)
  *G06Q 40/02* (2023.01)
  *H04L 9/06* (2006.01)

(56) References Cited

U.S. PATENT DOCUMENTS

| | | | |
|---|---|---|---|
| 2015/0332256 A1* | 11/2015 | Minor | H04L 9/50 705/69 |
| 2016/0027106 A1* | 1/2016 | Shahab | G06Q 40/03 705/38 |
| 2016/0335533 A1* | 11/2016 | Davis | G06Q 40/08 |
| 2017/0046689 A1* | 2/2017 | Lohe | G06Q 20/384 |
| 2017/0048209 A1* | 2/2017 | Lohe | G06Q 20/3829 |
| 2017/0048234 A1* | 2/2017 | Lohe | H04L 63/0807 |
| 2017/0048235 A1* | 2/2017 | Lohe | G06Q 50/01 |
| 2017/0083907 A1* | 3/2017 | McDonough | G06Q 20/3825 |
| 2017/0085545 A1* | 3/2017 | Lohe | G06Q 20/10 |
| 2017/0085555 A1* | 3/2017 | Bisikalo | G06Q 20/10 |
| 2017/0091756 A1* | 3/2017 | Stern | G06Q 20/36 |
| 2017/0098291 A1* | 4/2017 | Code | G06Q 40/02 |
| 2017/0109735 A1* | 4/2017 | Sheng | G06Q 20/3678 |
| 2017/0214522 A1* | 7/2017 | Code | H04L 63/0861 |
| 2017/0221052 A1* | 8/2017 | Sheng | H04L 9/14 |
| 2017/0236143 A1* | 8/2017 | Code | G06Q 20/387 705/14.27 |
| 2017/0364999 A1* | 12/2017 | Herriger | G06Q 30/0207 |
| 2018/0096752 A1* | 4/2018 | Ovalle | H01B 3/46 |
| 2018/0137507 A1* | 5/2018 | Jayachandran | G06Q 20/401 |
| 2018/0216946 A1* | 8/2018 | Gueye | G01C 21/3617 |
| 2018/0253702 A1* | 9/2018 | Dowding | H04L 63/123 |
| 2018/0268483 A1* | 9/2018 | Jayaram | G06Q 40/04 |
| 2018/0343307 A1* | 11/2018 | Lotter | G06Q 50/188 |
| 2018/0365764 A1* | 12/2018 | Nelson | H04L 9/0637 |
| 2019/0034922 A1* | 1/2019 | Castinado | G06Q 20/389 |
| 2019/0058592 A1* | 2/2019 | Wright | H04L 9/00 |
| 2019/0080392 A1* | 3/2019 | Youb | G06Q 20/38215 |
| 2019/0130394 A1* | 5/2019 | Stollman | G06Q 20/389 |
| 2019/0130399 A1* | 5/2019 | Wright | G06Q 20/3823 |
| 2019/0228409 A1 | 7/2019 | Madisetti et al. | |
| 2019/0259025 A1 | 8/2019 | Hilton et al. | |
| 2019/0311392 A1* | 10/2019 | Swamidurai | H04L 63/0442 |
| 2019/0333030 A1 | 10/2019 | Ramasamy et al. | |
| 2019/0333149 A1 | 10/2019 | Kim | |
| 2020/0143466 A1 | 5/2020 | Wu et al. | |
| 2020/0234286 A1 | 7/2020 | Simlett et al. | |
| 2020/0273100 A1 | 8/2020 | Cella | |
| 2020/0327609 A1 | 10/2020 | Dubrofsky | |
| 2020/0342531 A1* | 10/2020 | Pellini | G06N 20/00 |
| 2020/0380520 A1* | 12/2020 | Kavali | G06Q 20/4016 |
| 2020/0403899 A1* | 12/2020 | Bartolucci | H04L 45/02 |
| 2021/0042823 A1 | 2/2021 | McClelland et al. | |
| 2021/0049685 A1 | 2/2021 | Tachau et al. | |
| 2021/0204189 A1* | 7/2021 | Bartolucci | H04W 24/02 |
| 2021/0226986 A1* | 7/2021 | Bartolucci | H04L 9/50 |

OTHER PUBLICATIONS

Lipton A, Hardjono T, Pentland A. Digital trade coin: towards a more stable digital currency. R Soc Open Sci. 2018;5(7): 180155. Published Jul. 1, 20188.(Digital Trade) (Year: 2018).*
Getting Started with Enterprise Blockchain, by Michael Bradley, David Gorman, Matt Lucas, Matthew Golby-Kirk O'Reilly Media, Inc. (Jul. 2019). (Blockchain). (Year: 2019).*
M. Westerkamp, "Verifiable Smart Contract Portability," 2019 IEEE International Conference on Blockchain and Cryptocurrency (ICBC), 2019, pp. 1-9, (Smart Contract). (Year: 2019).*
P. J. Lu, L.-Y. Yeh and J.-L. Huang, "An Privacy-Preserving Cross-Organizational Authentication/Authorization/Accounting System Using Blockchain Technology," 2018 IEEE International Conference on Communications (ICC), Kansas City, MO, USA, 2018, pp. 1-6 (Privacy). (Year: 2018).*
International Search Report and Written Opinion dated Dec. 12, 2019, in PCT/US2019/048193 (7 pages).
International Search Report and Written Opinion dated Dec. 12, 2019, in PCT/US2019/048196 (6 pages).
International Search Report and Written Opinion dated Dec. 12, 2019, in PCT/US2019/048197 (8 pages).
International Search Report and Written Opinion issued to PCT Application No. PCT/OS2019/048197 dated Oct. 12, 2019.
International Search Report and Written Opinion issued to PCT Application No. PCT/US2019/048193 dated Oct. 12, 2019.
International Search Report and Written Opinion issued to PCT Application No. PCT/US2019/048196 dated Oct. 12, 2019.
AAVE, "AAVE Protocol Whitepaper V1.0," Jan. 2020, pp. 1-21.
United States Office Action, U.S. Appl. No. 16/551,626, dated Sep. 14, 2021, 23 pages.
United States Office Action, U.S. Appl. No. 16/551,630, dated Nov. 16, 2021, 15 pages.
Makerdao, "The Dai Stablecoin System," makerdao.com, Dec. 2017, pp. 1-21.
United States Office Action, U.S. Appl. No. 16/551,626, dated Oct. 24, 2022, 35 pages.
United States Office Action, U.S. Appl. No. 16/551,630, dated Jun. 13, 2022, 13 pages.
United States Office Action, U.S. Appl. No. 16/551,626, dated Mar. 31, 2022, 29 pages.

* cited by examiner

SYSTEMS AND METHODS FOR POOLING AND TRANSFERRING DIGITAL ASSETS

BACKGROUND

Blockchain technology uses decentralized, distributed networks for managing a chain of events in a form that resembles a digital ledger. Traditionally, data on the Internet is stored and retrieved in a client-server model. The data may be stored on a centralized server that may be controlled by a company. The company may therefore serve as a central authority that may be tasked with maintaining and securing the data. However, the client-server model may suffer from a centralized design, which permits a hacker to target a centralized server.

Blockchain technology provides a decentralized, distributed database in which data may be distributed through a peer-to-peer network rather than stored at a single network location. A blockchain may be a continuous chain of blocks containing data along with a hash pointer to a previous block. When new information (e.g., a new transaction) is to be added to the database, a new block may be created and added to the blockchain via a hash pointer to the previous block.

The use of hash pointers may ensure that any data entered into the blockchain remains immutable. For instance, if a hacker wishes to modify a prior transaction, the hacker would have to modify the block recording the transaction, as well as all prior blocks in the chain. As the blocks are distributed throughout the peer-to-peer network and new blocks are being added to the blockchain, modifying the prior transaction may be unfeasible. In addition, the blockchain may provide transparency as every transaction may be viewable.

Blockchain technology is commonly used for managing digital assets, such as cryptocurrencies and other digital tokens. With the proliferation of blockchain technologies, the market for digital assets managed by blockchains has grown. However, some of the sophistication of traditional financial markets have not followed suit with blockchain technology. For example, investors may trade time value of traditional assets. Interest rates may provide mechanisms for trading the time value of assets. Digital assets, in particular digital assets on blockchain protocols, may lack such mechanisms.

The present disclosure, therefore, identifies and addresses a need for systems and methods for pooling and transferring digital assets.

SUMMARY

As will be described in greater detail below, the present disclosure describes various systems and methods for pooling and transferring digital assets.

In one example, a method for pooling and transferring digital assets may include detecting a transaction event for a blockchain ledger. The transaction event may be associated with a pool of digital assets. The blockchain ledger may include a plurality of transaction records for the pool of digital assets and a plurality of accounts collectively owning the digital assets of the pool. Each account of the plurality of accounts may own a proportional portion of the digital assets corresponding to an account asset balance. The method may include calculating an exchange rate based on a cash balance of the pool, a liabilities balance of the pool, and an ownership distribution value. The ownership distribution value may be based on a distribution of the account asset balances. The method may further include updating the cash balance based on the exchange rate and the transaction event, and adding a transaction record for the transaction event to the plurality of transaction records.

In one embodiment, a system for pooling and transferring digital assets may include at least one physical processor and physical memory that includes computer-executable instructions that, when executed by the physical processor, cause the physical processor to detect a transaction event for a blockchain ledger. The transaction event may be associated with a pool of digital assets. The blockchain ledger may include a plurality of transaction records for the pool of digital assets, and a plurality of accounts collectively owning the digital assets of the pool. Each account of the plurality of accounts may own a proportional portion of the digital assets corresponding to an account asset balance. The instructions may further cause the processor to calculate an exchange rate based on a cash balance of the pool, a liabilities balance of the pool, and an ownership distribution value. The ownership distribution value may be based on a distribution of the account asset balances. The instructions may further cause the processor to update the cash balance based on the exchange rate and the transaction event, and add a transaction record for the transaction event to the plurality of transaction records.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to detect a transaction event for a blockchain ledger. The transaction event may be associated with a pool of digital assets. The blockchain ledger may include a plurality of transaction records for the pool of digital assets, and a plurality of accounts collectively owning the digital assets of the pool. Each account of the plurality of accounts may own a proportional portion of the digital assets corresponding to an account asset balance. The instructions may further cause the computing device to calculate an exchange rate based on a cash balance of the pool, a liabilities balance of the pool, and an ownership distribution value. The ownership distribution value may be based on a distribution of the account asset balances. The instructions may further cause the computing device to update the cash balance based on the exchange rate and the transaction event, and add a transaction record for the transaction event to the plurality of transaction records.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
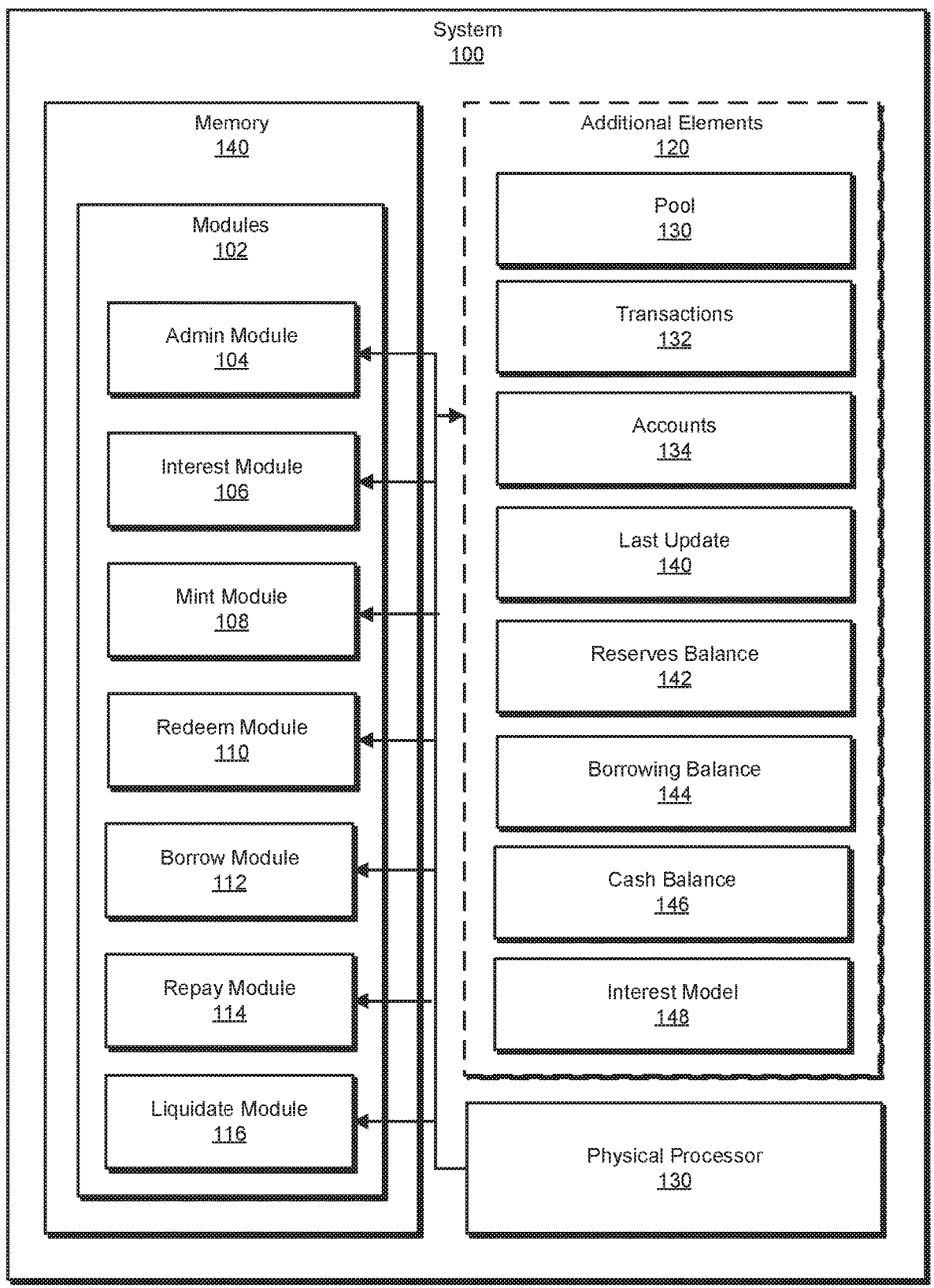
FIG. 1 is a block diagram of an example system for pooling and transferring digital assets.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Money markets may be established using a protocol on a blockchain network, such as Ethereum. The money markets may be pools of digital assets with interest rates that are algorithmically derived based on supply and demand for the digital asset. Suppliers and borrowers of a digital asset may interact directly with the protocol without having to negotiate terms such as interest rate, maturity, collateral, etc. Each money market or pool may be unique to each type of digital asset, such as ether, an ERC-20 compliant digital token in the form of a stablecoin such as Dai, an ERC-20 compliant digital token having utility such as Augur, etc.

The protocol may aggregate the supply of digital assets from each user such that the digital asset becomes a fungible resource. The digital assets may be more liquid than traditional direct lending, because users may withdraw their digital assets at any time without waiting for a specific loan to mature, unless every digital asset in the market is borrowed. Digital assets supplied to a market may be represented by a digital token, such as an ERC-20 compliant digital token, which may entitle the owner to an increasing quantity of the underlying digital asset. Digital tokens may become redeemable for an increasing amount of the underlying digital asset as the market accrues interest. Thus, simply holding digital tokens may earn interest as a function of borrowing demand for the money market.

The protocol allows users to borrow digital assets using other digital assets as collateral. Similar to supplying digital assets, each money market may have a floating interest rate, set by supply and demand functions, for determining a borrowing cost for each digital asset. Terms such as maturity dates, funding periods, etc., may not need to be established, and a user may specify a desired digital asset to instantly borrow the digital asset.

Digital assets held by the protocol and represented by digital tokens are used as collateral to borrow from the protocol. Each digital asset that may serve as collateral may have a collateral factor, which may range from 0 to 1, representing a portion of the collateral asset value that may be borrowed. Digital assets that do not make good collateral, such as illiquid, small-cap digital assets, may have low collateral factors. Liquid, high-cap digital assets may have high collateral factors. Users may borrow up to, without exceeding, their borrowing capacity. A user account's borrowing capacity may be determined from the sum of the value of the account's underlying digital token balances, multiplied by applicable collateral factors. The account may be prohibited from taking action (e.g., borrowing digital assets, transferring digital tokens, redeeming digital tokens) that would raise the total value of borrowed digital assets above the borrowing capacity. Thus, users of the protocol may be protected from default risk.

If the value of an account's outstanding borrowing balance exceeds its borrowing capacity, a portion of the outstanding borrowing balance may be repaid for the account's collateral digital assets at a current market price minus a liquidation discount. A close factor, which may range from 0 to 1, such as 25%, may limit a portion of the borrowed asset that can be repaid. The liquidation process may be called until the account's borrowing is less than its borrowing capacity.

Any account (e.g., blockchain address) that possesses the same digital asset as a borrowed digital asset may invoke the liquidation function to exchange the borrowed digital asset for the borrower's collateral. Liquidation may not rely on any outside systems or order-books and therefore may be invoked easily.

The protocol may utilize an interest rate model for achieving an interest rate equilibrium in each money market based on supply and demand. When demand is low, interest rates may be low, and vice versa when demand is high. In one example, the interest rate for an asset a (e.g., a money market or pool with a as the underlying asset) may be determined based on the following equations:

$$U_a = \text{Borrows}_a / (\text{Cash}_a + \text{Borrows}_a) \qquad \text{Equation 1:}$$

$$\text{Borrowing Interest Rate}_a = 2.5\% + U_a * 20\% \qquad \text{Equation 2:}$$

The protocol may not guarantee liquidity and may instead rely on the interest rate model to incentivize liquidity. During periods of extremely high demand for a digital asset, the liquidity (e.g., the digital assets available to withdraw or borrow) may decline, which may raise interest rates, incentivize supply, and disincentivize borrowing. During periods of extremely low demand for a digital asset, the liquidity may decline, which may lower interest rates, incentivize demand, and disincentivize supplying.

Each money market or pool may have its own interest rate, which may be applied to all borrowers uniformly, that adjusts over time as supply and demand changes. An interest rate index captures a history of an associated interest rate and is calculated each time the associated interest rate changes, such as from user operations including minting, redeeming, borrowing, repaying, or liquidating digital assets. The interest rate index may be updated to compound the interest since the prior index. The interest rate index may be updated based on the following equation, wherein the interest rate for the period t since the last update is denominated by r*t:

$$\text{Index}_{a,n} = \text{Index}_{a,(n-1)} * (1 + r^* t) \quad \text{Equation 3:}$$

The pool's total borrowing outstanding balance may also be updated to include the interest accrued since the last index. The total borrow balance may be updated based on the following equation:

$$\text{totalBorrowBalance}_{a,n} = \text{totalBorrowBalance}_{a,(n-1)} * (1 + r^* t) \quad \text{Equation 4:}$$

A portion of the accrued interest may be set aside or retained as reserves. For example, reserves may be set aside whenever interest is accrued (e.g., when a balance value is updated). The reserves may be determined by a reserve factor which may range from 0 to 1. The reserves may be updated based on the following equation:

$$\text{reserves}_{a,n} = \text{reserves}_{a,(n-1)} + \text{totalBorrowBalance}_{a,(n-1)} * (r^* t^* \text{reserveFactor}) \quad \text{Equation 5:}$$

For each money market, a fundamental accounting equation may be:

$$\text{cash}_a + \text{borrows}_a = \text{liabilities}_a + \text{reserves}_a \quad \text{Equation 6:}$$

The $\text{cash}_a$ value may be a balance of the money market in the underlying digital asset. The $\text{borrows}_a$ may be the total amount borrowed by users of the digital asset across all accounts, with accrued interest. The $\text{liabilities}_a$ may be the total amount owed to digital token holders across all accounts, with accrued interest. The $\text{reserves}_a$ may be the total equity amount owned by the protocol, with accrued interest. The $\text{cash}_a$ value may be tracked based on the underlying smart contract (e.g., an ERC-20 digital token contract). The $\text{borrows}_a$ value may be tracked based on transactions. The $\text{reserves}_a$ value may be explicitly tracked in order to add and remove reserves easily. Thus, the $\text{liabilities}_a$ value may be implicitly tracked by calculating from equation 6 and the other tracked values.

In an exemplary embodiment, the protocol may establish each money market or pool as a smart contract implementing the ERC-20 digital token specification. User balances for the pool may be represented as digital token balances. The borrower's balance, which may include accrued interest, may be defined as a ratio of the current interest rate index divided by the index when the borrower's balance was last checkpointed. For example, the borrower balance for each borrower account may be stored as an account checkpoint that includes a balance, such as a digital token balance, and an index value corresponding to the index at the time interest was last applied to the account.

The price, or exchange rate, between digital tokens and the underlying digital asset may increase over time as interest is accrued by borrowers of that type of digital asset. In one example, the exchange rate may be determined based on the following equation:

$$\text{exchangeRate} = (\text{underlyingBalance} + \text{totalBorrowBalance}_a - \text{reserves}_a) / \text{tokenSupply}_a \quad \text{Equation 7:}$$

A mint operation by an account may transfer an underlying digital asset from the account into the pool and accordingly update the account's digital token balance. The underlying digital asset may be specified by a reference, such as an amount of the underlying digital asset. The account's digital token balance may be increased based on the underlying digital asset and the exchange rate.

A redeem operation by an account may transfer an underlying digital asset out of the pool to the account and accordingly update the account's digital token balance. The underlying digital asset may be specified by a reference, such as an amount of the underlying digital asset. The account's digital token balance may be decreased based on the underlying digital asset and the exchange rate.

A borrow operation by an account may transfer an underlying digital asset, if the account has sufficient collateral, out of the pool and into the account and accordingly update the account's borrow balance. The account's borrow balance may be increased based on the underlying digital asset. Borrows may accrue interest similar to the balance interest (e.g., the total borrow balance as described above with Equations 3 and 4). A borrower may repay an outstanding loan at any time, through a repay operation which repays the outstanding balance.

A repay operation by an account may transfer an underlying digital asset from the account into the pool and accordingly update the account's borrow balance. The account's borrow balance may be decreased based on the underlying digital asset. The repay operation may be initiated on behalf of another account.

A liquidate operation by a target (e.g., a liquidator) for an account may transfer an underlying digital asset from the account (e.g., an underwater borrower) into the pool and accordingly update the account's borrow balance. Digital asset collateral may also be transferred from the account to the target. The liquidate operation may be similar to a repay operation with the source of digital assets being the target rather than the borrower. The borrower's digital tokens of equivalent value may then be transferred to the target to complete the liquidate operation. The target may subsequently call a redeem operation.

For a liquidate operation, the amount of digital tokens to be transferred may be determined based on the following equations:

$$\text{underlyingTokensSeized} \times \text{oracle}_{collateral} = (\text{amountRepaid} \times \text{oracle}_{borrow}) / \text{liquidationDiscount} \quad \text{Equation 8:}$$

$$\text{amountToTransfer} = \text{underlyingTokensSeized} \times \text{tokenMintRate}_{collateral} \quad \text{Equation 9:}$$

The amountRepaid may be supplied by the liquidator (and may be used during repayment). The liquidationDiscount may be a constant ranging from 0 to 1, such as 0.05 or 0.10, and may be maintained by an admin. The liquidationDiscount may specifically be between 0 and (1−collateral factor) for the collateral digital asset. The $\text{oracle}_{collateral}$ and $\text{oracle}_{borrow}$ may be prices or exchange rates provided by a price oracle. The underlyingTokensSeized may be an amount of the underlying asset of collateral tokens necessary for liquidation. The underlyingTokensSeized amount may be multiplied by an exchange rate (e.g., $\text{tokenMintRate}_{collateral}$) to determine an actual amount to transfer, amountToTransfer. The actual amount to transfer may then be used to update collateral balances for the account and the target (e.g., removing the actual amount to transfer from the account and adding the actual amount to transfer to the target).

The exchange rates of both collateral digital assets and borrow digital tokens may be left unchanged by a liquidation operation. With a successful liquidation, a utilization rate for the borrowed digital asset may decrease and a utilization rate for the collateral digital asset may be unchanged.

Certain digital assets, for instance underlying digital assets for each pool, may fluctuate in value outside of the protocol. The protocol may implement a price oracle for maintaining the current exchange rate of each supported digital asset. The price oracle may establish values for digital assets, for instance by aggregating prices from the top ten exchange markets for the asset.

The protocol may also implement a comptroller as a policy layer. In order for users to interact with a type of digital asset, the protocol must support the digital asset. The comptroller may include an admin function to support a market using a specified interest rate model. In order to borrow a digital asset, the price oracle must establish a valid price for the digital asset. In order to use a digital asset as collateral, a valid price and a collateral factor for the digital asset must be established.

Although the protocol may begin with centralized control (e.g., choosing the interest rate model per digital asset), control may over time transition to complete community and stakeholder control. However certain protocol rights may be controlled by the protocol admin, including: listing a new (digital token) market; updating the interest rate model per market; updating the price oracle; withdrawing reserves of a pool; and choosing a new admin.

The present disclosure is generally directed to systems and methods for pooling and transferring digital assets. The following will provide, with reference to FIGS. 1-2, detailed descriptions of example systems for pooling and transferring digital assets. Detailed descriptions of corresponding computer-implemented methods will also be provided in connection with FIG. 10. Detailed descriptions of operations will be provided in connection with FIGS. 3-9, including a pooling operation (FIG. 3), a minting operation (FIG. 4), a redeem operation (FIG. 5), an interest rate update (FIG. 6), a borrow operation (FIG. 7), a repay operation (FIG. 8), and a liquidate operation (FIG. 9). In addition, detailed descriptions of an example computing system and network architecture capable of implementing one or more of the embodiments described herein will be provided in connection with FIGS. 11 and 12, respectively.

FIG. 1 is a block diagram of an example system 100 for pooling and transferring digital assets. As illustrated in this figure, example system 100 may include one or more modules 102 for performing one or more tasks. As will be explained in greater detail below, modules 102 may include an admin module 104, an interest module 106, a mint module 108, a redeem module 110, a borrow module 112, a repay module 114, and a liquidate module 116. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate pooling and transferring digital assets. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as a pool 130, transaction 132, accounts 134, a last update 140, a reserved balance 142, a borrowing balance 144, a cash balance 146, and an interest index 148. Additional elements 120, such as pool 130, transaction 132, accounts 134, last update 140, reserves balance 142, borrowing balance 144, cash balance 146, and interest model 148, may represent various data points that may be used and maintained by the protocol.

Figure 2:
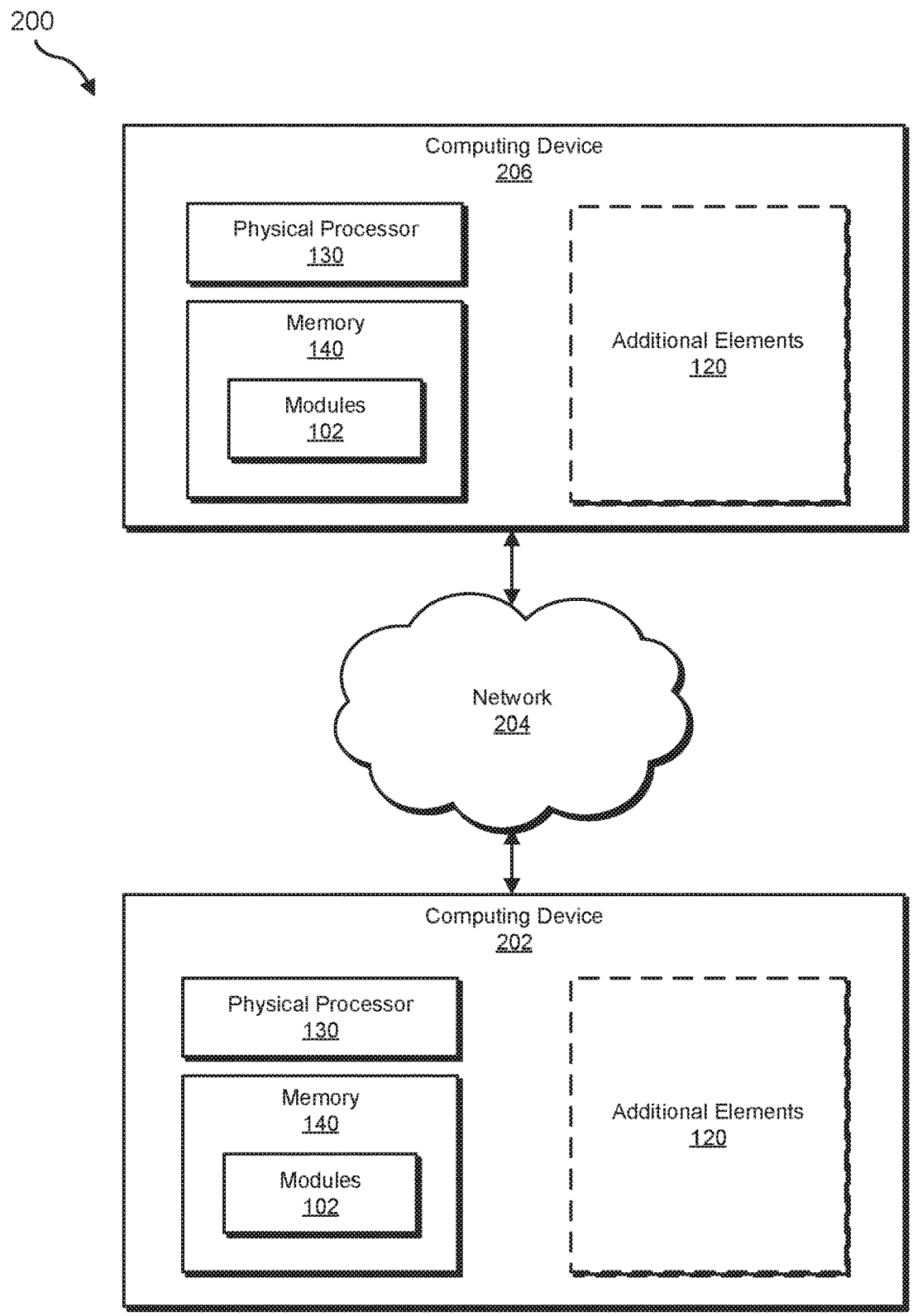
FIG. 2 is a block diagram of an additional example system for pooling and transferring digital assets.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a computing device 206 via a network 204. In one example, all or a portion of the functionality of modules 102 may be performed by computing device 202, computing device 206, and/or any other suitable computing system. As will be described in greater detail below, one or more of modules 102 from FIG. 1 may, when executed by at least one processor of computing device 202 and/or computing device 206, enable computing device 202 and/or computing device 206 to pool digital assets for transferring. For example, and as will be described in greater detail below, one or more of modules 102 may cause computing device 202 and/or computing device 206 to recite steps of method claim using FIG. 2.

Computing device 202 generally represents any type or form of computing device capable of reading computer-executable instructions. Computing device 202 may be a user device. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Computing device 206 generally represents any type or form of computing device that is capable of reading computer-executable instructions. Computing device 206 may be a user device. Examples of computing device 206 include, without limitation, security servers, application servers, web servers, storage servers, and/or database servers configured to run certain software applications and/or provide various security, web, storage, and/or database services. Although illustrated as a single entity in FIG. 2, computing device 206 may include and/or represent a plurality of servers that work and/or operate in conjunction with one another.

Network 204 generally represents any medium or architecture capable of facilitating communication or data transfer. In one example, network 204 may facilitate communication between computing device 202 and computing device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Network 204 may be a peer-to-peer network in which computing device 202 and computing device 206 may share resources, such as data, without going through a separate server. The peer-to-peer network may enable a distributed database to be shared by computing device 202 and computing device 206. The distributed database, rather than stored at a central server, may be stored on both computing device 202 and computing device 206. The distributed database may be a blockchain ledger or other database for storing transaction data.

In one example, a protocol as described herein may be implemented with a blockchain network, such as Ethereum or any other network. Pool 130 may be implemented as a smart contract. The term "smart contract," as used herein, generally refers to a computer protocol that may perform a contract, such as transferring digital assets, based on automatically enforceable conditions. Smart contracts may be implemented on a blockchain network.

Pool 130 may be a smart contract having a local data storage for transactions 132, accounts 134, last update 140, reserves balance 142, borrowing balance 144, cash balance 146, and interest model 148. The smart contract may have an interaction layer for performing operations based on sent and received messages. Accounts 134 may include user accounts for users interacting with pool 130. The user accounts may be, for instance, blockchain wallet addresses for digital assets, user IDs, and/or other identifiers.

Digital tokens may represent digital assets such that the assets and liabilities of pool 130 may be stored as digital token balances (e.g., a number of digital tokens). Reserves balance 142 may correspond to a total equity amount, including accrued interest, owned by pool 130. Borrowing balance 144 may correspond to a total of underlying digital assets borrowed out to users and may include accrued interest. Cash balance 146 may correspond to a balance of the underlying digital asset owned by pool 130. Pool 130 may also optionally track a liabilities balance (which may be calculated by subtracting reserves balance 142 from a sum of cash balance 146 and borrowing balance 144) that may correspond to a total amount, including accrued interest, owed to digital token holders (e.g., users who have contributed to cash balance 146). Ownership distribution may be maintained pro-rata. For example, if a first user contributes 3 digital tokens' worth to pool 130 and a second user contributes 1 digital token's worth, the first user may own 75% of pool 130 and the second user may own 25% of the pool. If a third user contributes 2 digital tokens, the first user may now own 50% of the pool, the second user may now own 16.66% of the pool, and the third user may now own 33.33% of the pool. The pro-rata ownership distribution may be tracked and updated for each transaction. The digital tokens themselves may further be transferred, such as between accounts, and may further serve as an underlying digital asset for another pool. Although pool 130 may utilize digital token balances for tracking the ownership distribution, in other embodiments the ownership distribution may be separately tracked.

Transactions 132 may include records of transactions for pool 130. For example, in a blockchain environment, each transaction may form a basis for a new block. Datum, such as accounts 134, last update 140, reserves balance 142, borrowing balance 144, cash balance 146, and/or interest model 148, may be updated and stored. Last update 140 may include a timestamp corresponding to the last time of updating one or more datum as described herein. Interest model 148 may correspond to internally used values, including various index values such as an automatically updated interest rate and other transaction rates, as will be described further below.

Pool 130 may include functions and other functionality that may be implemented with modules 102. Admin module 104 may implement various protocol rights which may be controlled by an admin, including but not limited to: listing a new digital asset market; updating an interest rate model per market; updating a price oracle address; withdrawing a reserve of a digital token; and choosing a new admin. Interest model 106 may implement an interest rate model for automatically determining an interest rate, as will be described further below. Interest model 106 may also include various other index values and/or transaction rates, such as an interest rate, interest rate index, exchange rate, etc. Mint module 108 may operate a mint operation for adding digital assets to pool 130, as described herein. Redeem module 110 may implement a redeem operation for removing digital assets from pool 130 (e.g., a reverse of the mint operation), as described herein. Borrow module 112 may implement a borrow operation for borrowing digital assets from pool 130, as described herein. Repay module 114 may implement a repay operation for repaying borrowed digital assets to pool 130 (e.g., a revers of the borrow operation), as described herein. Liquidate module 116 may implement a liquidate operation for liquidating an underwater user's digital assets, as described herein.

Although illustrated as separate module in FIG. 1, any of modules 102 may be implemented in any combination. Modules 102 may also perform other functions for pool 130, such as performing risk analysis or preventing prohibited actions. In addition, although pool 130 is implemented on a blockchain network, in other embodiments pool 130 may be implemented without a blockchain.

Figure 3:
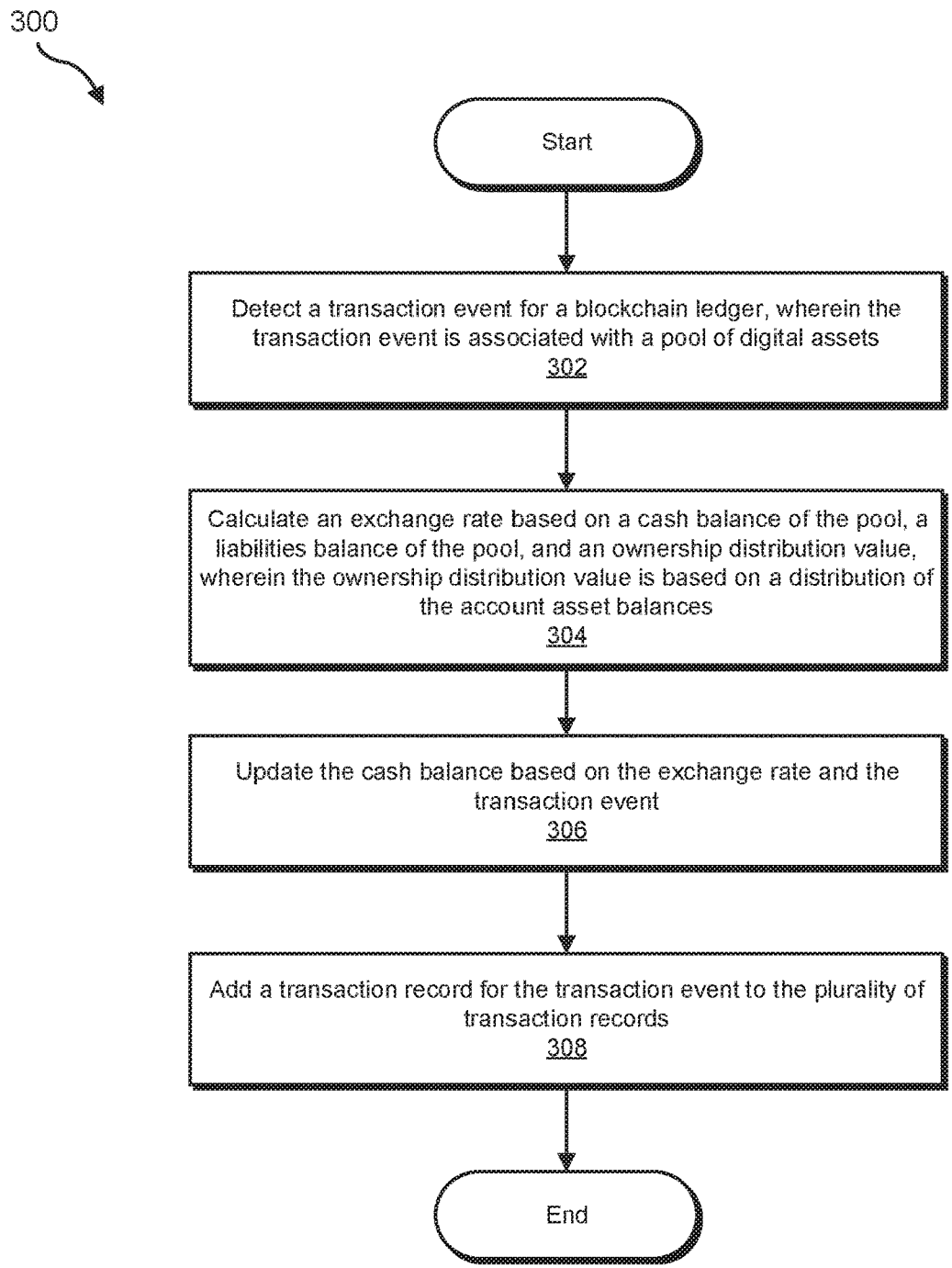
FIG. 3 is a flow diagram of an example method for a pooling operation.

FIG. 3 is a flow diagram of an example computer-implemented method 300 for pooling and transferring digital assets. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect a transaction event for a blockchain ledger. The transaction event may be associated with a pool of digital assets. The blockchain ledger may include a plurality of transaction records for the pool of digital assets and a plurality of accounts collectively owning the digital assets of the pool. Each account of the plurality of accounts may own a proportional portion of the digital assets corresponding to an account asset balance. For example, admin module 104 may, as part of computing device 202 in FIG. 2, detect a transaction event for pool 130.

The term "accounts," as used herein, generally refers to identifiers for identifying users or other entities interacting with the protocol. Examples of accounts include, without limitation, blockchain wallet addresses (e.g., as used in blockchain networks), user IDs, user records, etc.

The systems described herein may perform step 302 in a variety of ways. In one example, admin module 104 may detect an operation, such as a mint operation, redeem operation, borrow operation, repay operation, and/or liquidate operation.

At step 304 one or more of the systems described herein may calculate an exchange rate based on a cash balance of the pool, a liabilities balance of the pool, and an ownership distribution value. The ownership distribution value may be based on a distribution of the account asset balances, such as a pro-rata ownership. Interest module 106 may, as part of computing device 202 in FIG. 2, calculate an exchange rate using cash balance 146, borrowing balance 144, and an ownership distribution value based on accounts 134. The liabilities balance of pool 130 may be calculated based on subtracting reserves balance 142 from a sum of cash balance 146 and borrowing balance 144.

The systems described herein may perform step 304 in a variety of ways. In one example, interest module 106 may calculate the exchange rate based on equation 6 as described herein. The exchange rate may be calculated based on subtracting the liabilities balance from cash balance 146 and dividing the subtraction result by the ownership distribution value. The exchange rate may be automatically calculated when an operation occurs such that the operation may utilize the updated exchange rate for further calculations. In some implementations, the exchange rate may be stored in interest model 148.

At step 306 one or more of the systems described herein may update the cash balance based on the exchange rate and the transaction event. For example, interest module 106 may, as part of computing device 202 in FIG. 2, modify cash balance 146 based on the exchange rate.

The systems described herein may perform step 306 in a variety of ways. In one example, interest module 106 and/or any of the modules 102 may perform the transaction event and accordingly update cash balance 146. For example, the transaction event may be a mint or redeem operation.

At step 308 one or more of the systems described herein may add a transaction record for the transaction event to the plurality of transaction records. For example, interest module 106 may, as part of computing device 202 in FIG. 2, add a transaction record for the transaction event to transactions 132.

The systems described herein may perform step 308 in a variety of ways. In one example, interest module 106, and/or any other of the modules 102, may add a record of the transaction event to transaction 132 upon successful completion of the transaction. However, the transaction may fail, for instance, if there are insufficient assets for completing the transaction. In such scenarios, the failed transaction may not result in a new record. Alternatively, the failed transaction may be recorded as a failed transaction.

Figure 4:
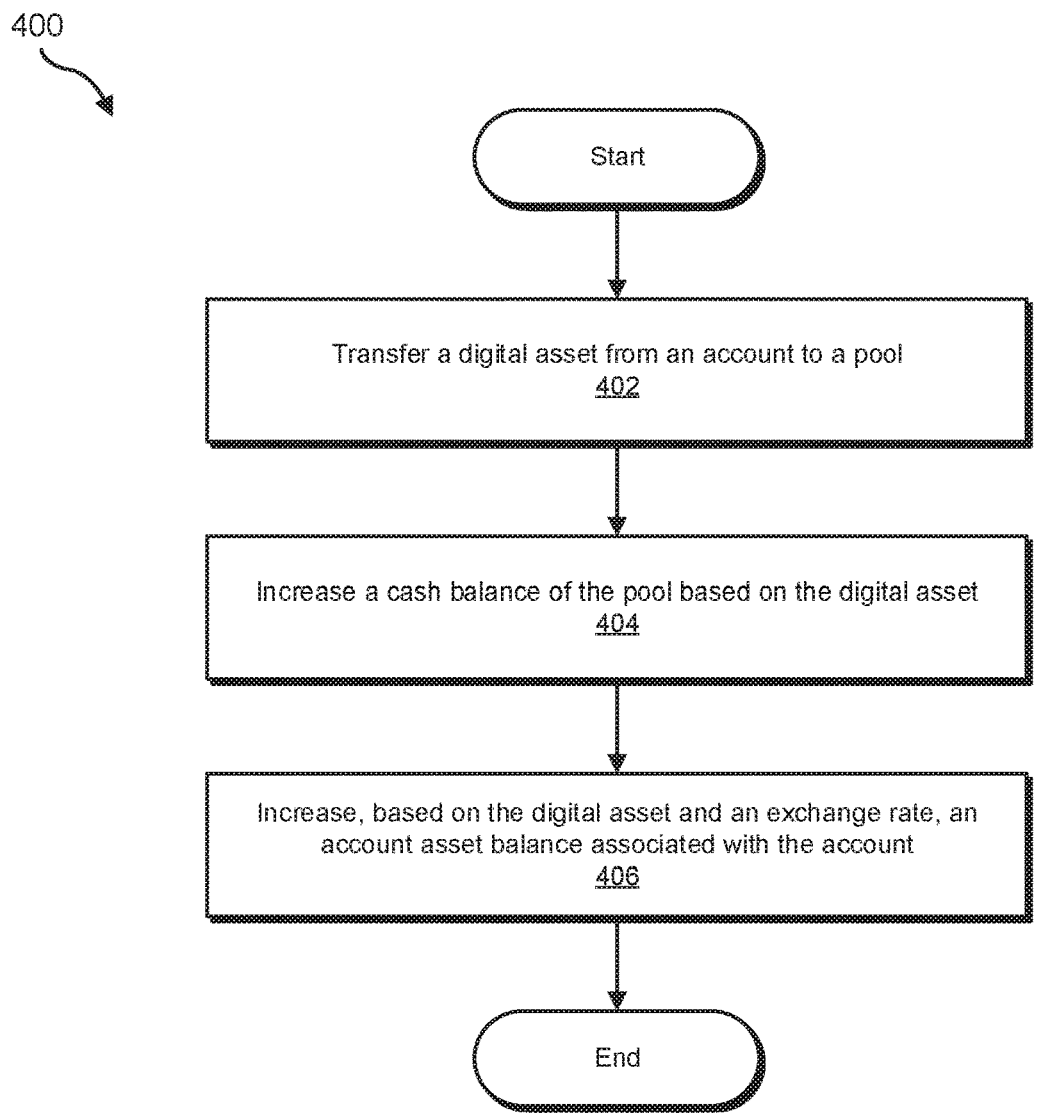
FIG. 4 is a flow diagram of an example method for a minting operation.

FIG. 4 is a flow diagram of an example computer-implemented method 400 for a mint operation. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may transfer a digital asset from an account to the pool. For example, mint module 108 may, as part of computing device 202 in FIG. 2, transfer a digital asset from a specified account of accounts 134 to pool 130.

At step 404 one or more of the systems described herein may increase a cash balance for the pool based on the digital asset. For example, mint module 108 may, as part of computing device 202 in FIG. 2, increase cash balance 146 based on the asset.

At step 406 one or more of the systems described herein may increase, based on the digital asset and the exchange rate, an account asset balance associated with the account. For example, mint module 108 may, as part of computing device 202 in FIG. 2, increase an account asset balance for the specified account of accounts 134. Mint module 108 may increase the account asset balance by a number of tokens corresponding in value to the asset, as determined using the exchange rate.

Figure 5:
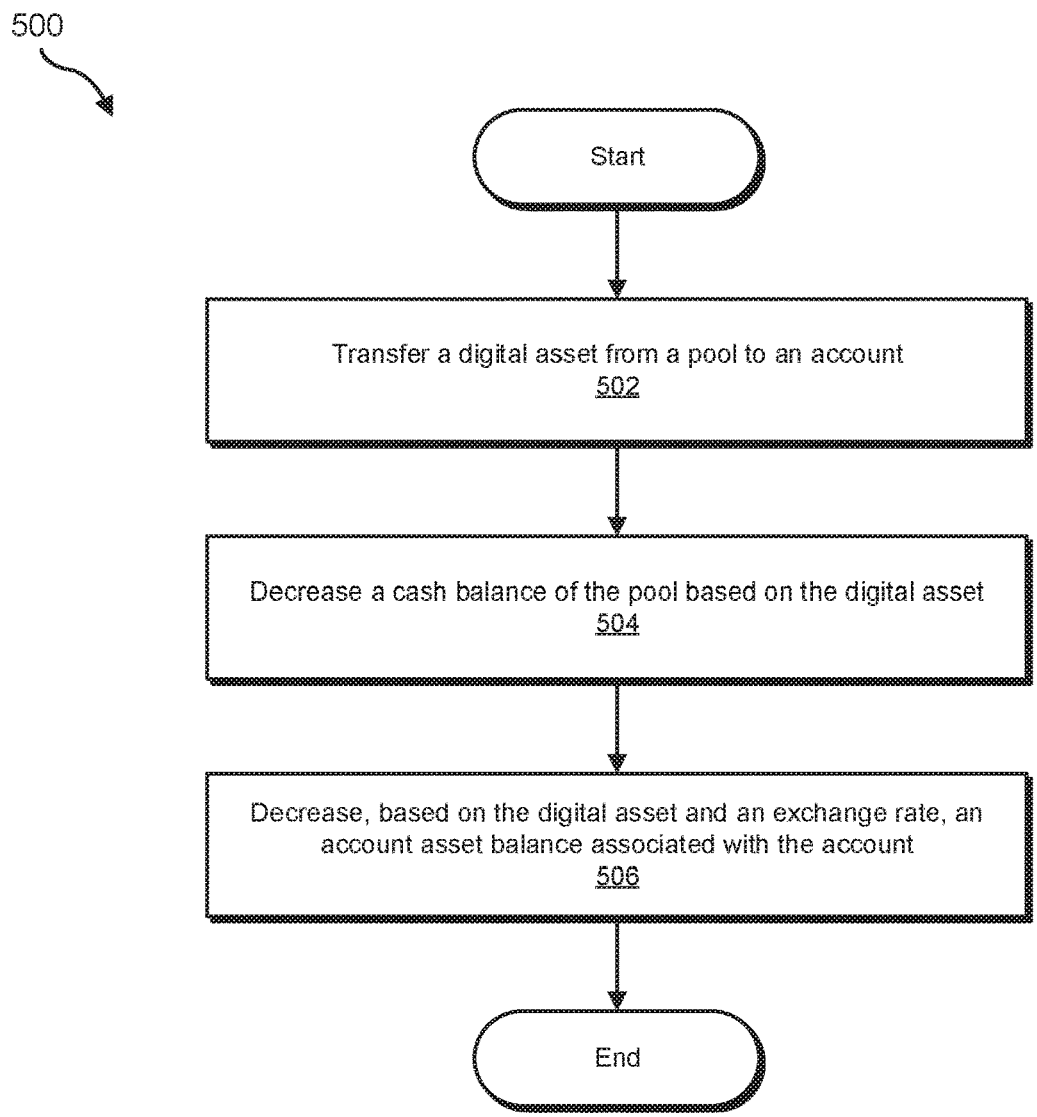
FIG. 5 is a flow diagram of an example method for a redeeming operation.

FIG. 5 is a flow diagram of an example computer-implemented method 500 for a redeem operation. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 502 one or more of the systems described herein may transfer a digital asset from the pool to an account. For example, redeem module 110 may, as part of computing device 202 in FIG. 2, transfer a digital asset from pool 130 to a specified account of accounts 134.

At step 504 one or more of the systems described herein may decrease the cash balance for the pool based on the digital asset. For example, redeem module 110 may, as part of computing device 202 in FIG. 2, decrease cash balance 146.

At step 506 one or more of the systems described herein may decrease, based on the digital asset and the exchange rate, an account asset balance associated with the account. For example, redeem module 110 may, as part of computing device 202 in FIG. 2, decrease an account asset balance value associated with the specified account of accounts 134. Redeem module 110 may decrease the account asset balance by a number of tokens corresponding in value to the asset, as determined using the exchange rate.

In some implementations, redeem module 110 may cancel the redeem operation if certain conditions fail. For example, if the redeem operation causes cash balance 146 to fall below a threshold value, redeem module 110 may cancel the redeem operation.

Figure 6:
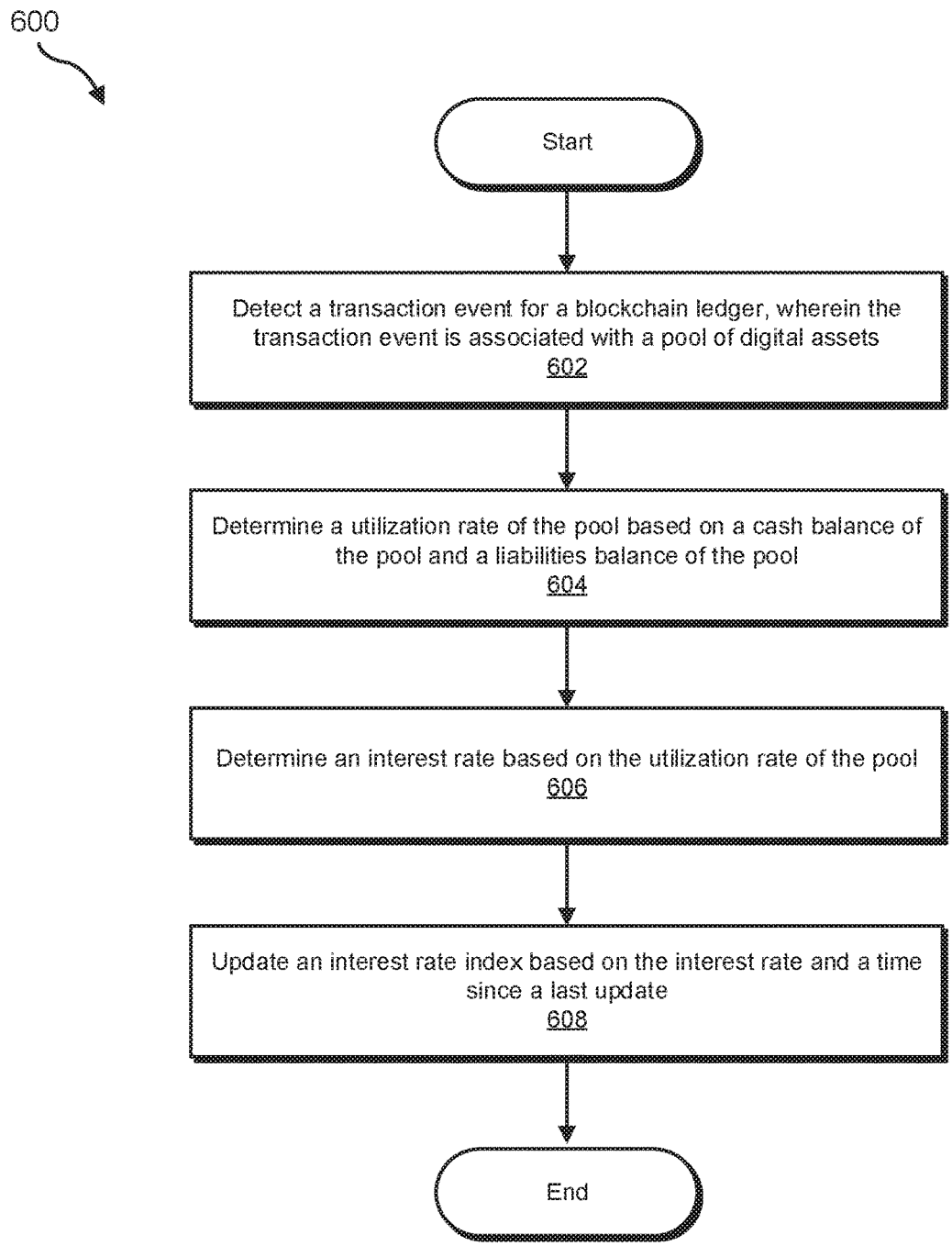
FIG. 6 is a flow diagram of an example method for updating an interest rate.

FIG. 6 is a flow diagram of an example computer-implemented method 600 for determining an interest rate for a pool. The steps shown in FIG. 6 may be performed by any suitable computer-executable code and/or computing system, including system 100 in FIG. 1, system 200 in FIG. 2, and/or variations or combinations of one or more of the same. In one example, each of the steps shown in FIG. 6 may represent an algorithm whose structure includes and/or is represented by multiple sub-steps, examples of which will be provided in greater detail below.

As illustrated in FIG. 6, at step 602 one or more of the systems described herein may detect a transaction event for a blockchain ledger. The transaction event may be associated with a pool of digital assets. The blockchain ledger may include a plurality of transaction records for the pool of digital assets and a plurality of accounts collectively owning the digital assets of the pool. Each account of the plurality of accounts may own a proportional portion of the digital assets. Interest module 106 may, as part of computing device 202 in FIG. 2, detect a transaction event for pool 130.

At step 604 one or more of the systems described herein may determine a utilization rate of the pool based on a cash balance and a liabilities balance. For example, interest module 106 may, as part of computing device 202 in FIG. 2, determine a utilization rate based at least on cash balance 146. The liabilities balance of pool 130 may be calculated based on subtracting reserves balance 142 from a sum of cash balance 146 and borrowing balance 144.

At step 606 one or more of the systems described herein may determine an interest rate based on the utilization rate of the pool. For example, interest module 106 may, as part of computing device 202 in FIG. 2, determine an interest rate based on the utilization rate determined at step 604. The systems described herein may perform step 606 in a variety of ways. In one example, the exchange rate may be based on Equation 2 described herein.

At step 608 one or more of the systems described herein may update the interest rate index based on the interest rate and a time since last update. For example, interest module 106 may, as part of computing device 202 in FIG. 2, update interest index 148. The systems described herein may perform step 608 in a variety of ways. In one example, the interest rate index may be based on Equation 3 described herein.

In addition, interest module 106 may, as part of computing device 202 in FIG. 2, update last update 140 with a timestamp. In certain implementations, interest module 106 may update an interest index based on a time since last update 140. The interest index may correspond to a change in interest rate. Moreover, in certain implementations, interest module 106 may update reserves balance 142. For example, interest module 106 may add a portion (based on a reserve factor) of interest accrued from borrowing balance 144 to reserves balance 142.

Figure 7:
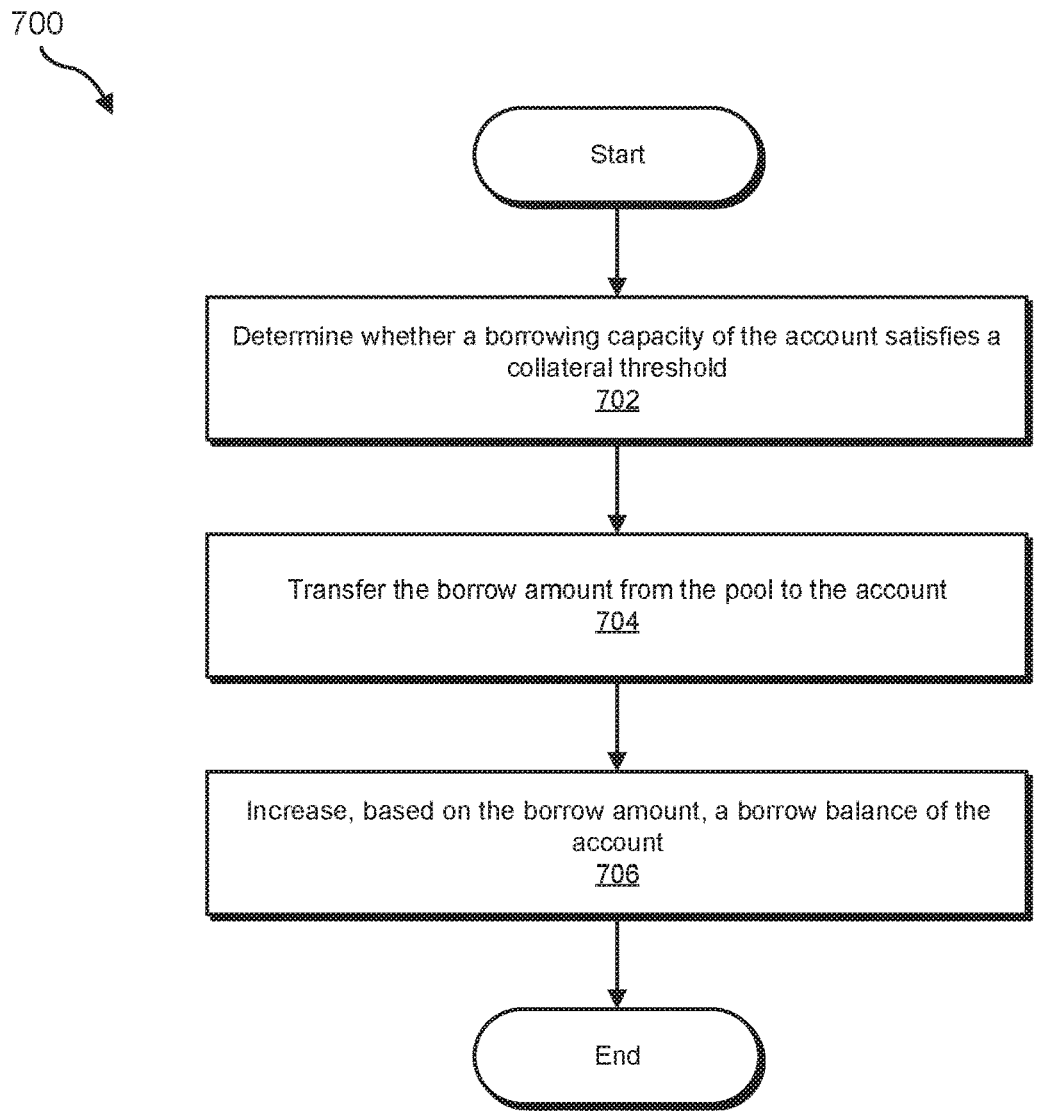
FIG. 7 is a flow diagram of an example method for a borrowing operation.

FIG. 7 is a flow diagram of an example computer-implemented method 700 for a borrow operation. The steps shown in FIG. 7 may be performed by any suitable computer-executable code and/or computing system, including system 100 in FIG. 1, system 200 in FIG. 2, and/or variations or combinations of one or more of the same. In one example, each of the steps shown in FIG. 7 may represent an algorithm whose structure includes and/or is represented by multiple sub-steps, examples of which will be provided in greater detail below.

As illustrated in FIG. 7, at step 702 one or more of the systems described herein may determine whether a borrowing capacity of the account satisfies a collateral threshold. For example, borrow module 112 may, as part of computing device 202 in FIG. 2, determine a borrowing capacity. The systems described herein may perform step 702 in a variety of ways. In one example, borrow module 112 may determine the borrowing capacity based on a collateral factor applied to an account asset balance of the specified account.

At step 704 one or more of the systems described herein may transfer the borrow amount from the pool to the account. For example, borrow module 112 may, as part of computing device 202 in FIG. 2, transfer the borrow amount from pool 130 to the specified account of accounts 134.

At step 706 one or more of the systems described herein may increase a borrow balance of the account based on the borrow amount. For example, borrow module 112 may, as part of computing device 202 in FIG. 2, update a borrowing balance value for the specified account of accounts 134.

Figure 8:
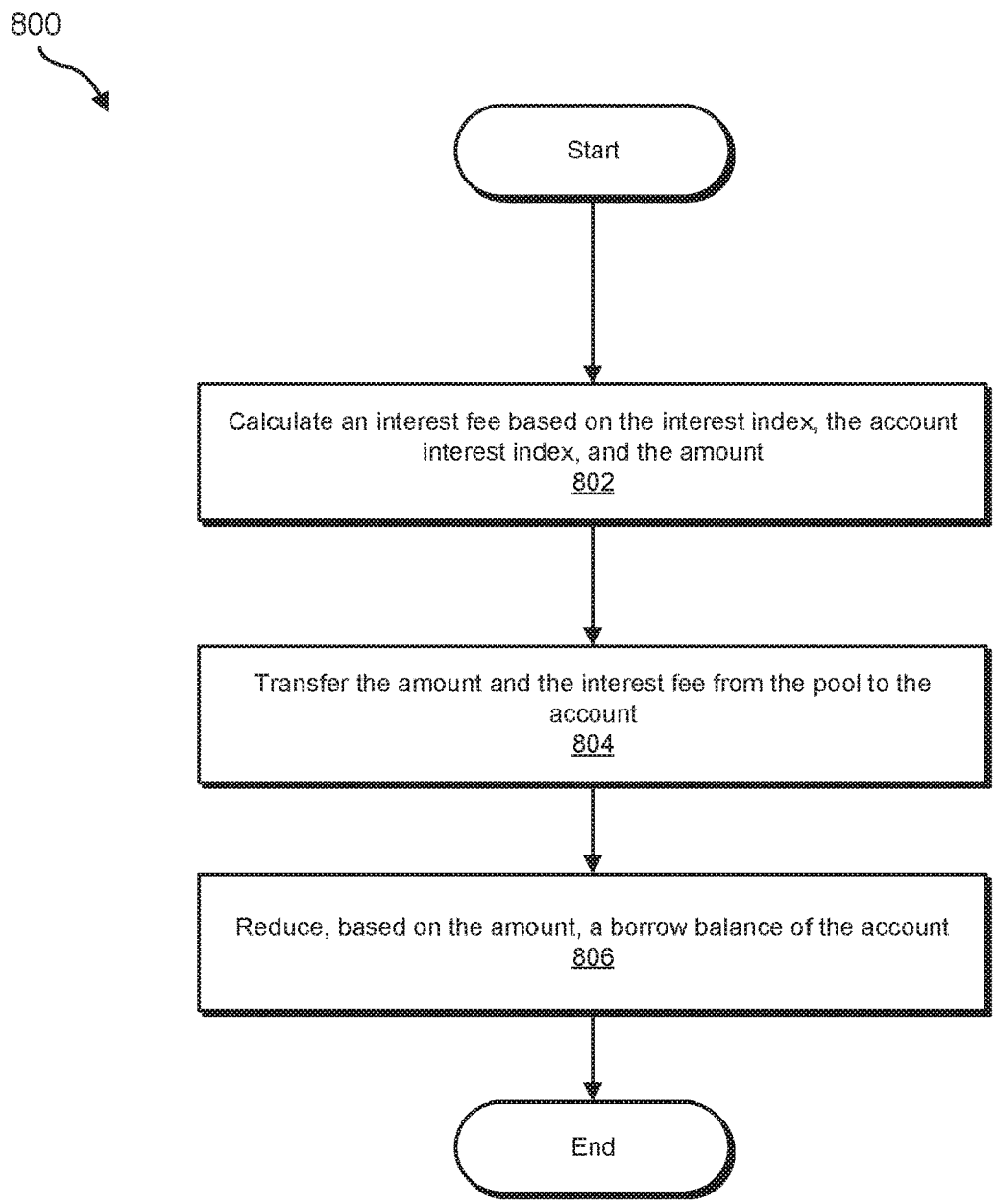
FIG. 8 is a flow diagram of an example method for a repay operation.
Figure 9:
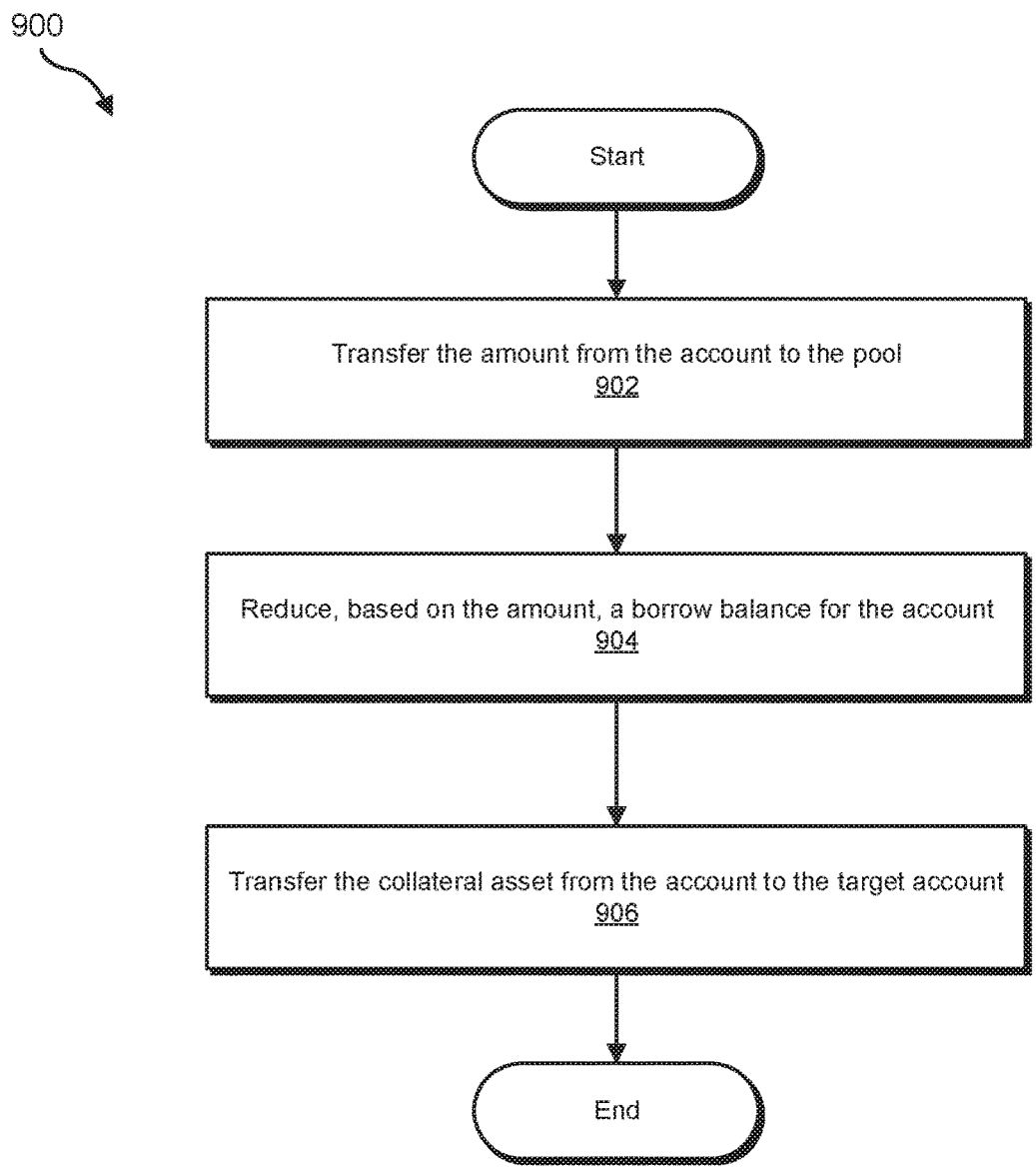
FIG. 9 is a flow diagram of an example method for a liquidate operation

FIG. 8 is a flow diagram of an example computer-implemented method 800 for a repay operation. The steps shown in FIG. 8 may be performed by any suitable computer-executable code and/or computing system, including system 100 in FIG. 1, system 200 in FIG. 2, and/or variations or combinations of one or more of the same. In one example, each of the steps shown in FIG. 8 may represent an algorithm whose structure includes and/or is represented by multiple sub-steps, examples of which will be provided in greater detail below.

As illustrated in FIG. 8, at step 802 one or more of the systems described herein may calculate an interest fee based on the interest index, the account interest index, and the amount. For example, repay module 114 may, as part of computing device 202 in FIG. 2, may calculate the interest fee.

The systems described herein may perform step 802 in a variety of ways. In one example, repay module 114 may calculate the interest fee by dividing the interest index by the account interest index and multiplying the division result by the amount.

At step 804 one or more of the systems described herein may transfer the amount and the interest fee from the pool to the account. For example, repay module 114 may, as part of computing device 202 in FIG. 2, transfer the amount from pool 130 to the specified account of accounts 134.

At step 806 one or more of the systems described herein may reduce, based on the amount, a borrow balance of the account. For example, repay module 114 may, as part of computing device 202 in FIG. 2, reduce the borrow balance for the specified account.

FIG. 9 is a flow diagram of an example computer-implemented method 900 for a liquidate operation. The steps shown in FIG. 9 may be performed by any suitable computer-executable code and/or computing system, including system 100 in FIG. 1, system 200 in FIG. 2, and/or variations or combinations of one or more of the same. In one example, each of the steps shown in FIG. 9 may represent an algorithm whose structure includes and/or is represented by multiple sub-steps, examples of which will be provided in greater detail below.

As illustrated in FIG. 9, at step 902 one or more of the systems described herein may transfer an amount from an account to a pool. For example, liquidate module 116 may, as part of computing device 202 in FIG. 2, may transfer the amount to pool 130 from the specified account of accounts 134.

The systems described herein may perform step 902 in a variety of ways. In one example, the amount may be a proportion of a borrow balance for the specified account. The amount may be determined based on a close factor.

At step 904 one or more of the systems described herein may reduce, based on the amount, a borrow balance for the account. For example, liquidate module 116 may, as part of computing device 202 in FIG. 2, may reduce the borrow balance for the specified account.

At step 906 one or more of the systems described herein may transfer the collateral asset from the account to the target. For example, liquidate module 116 may, as part of computing device 202 in FIG. 2, transfer the collateral asset from the specified account to the target, which may be another account of accounts 134.

The systems described herein may perform step 906 in a variety of ways. In one example, the collateral asset may be a digital token transferred from the specified account to the target account. The liquidate operation may be canceled if certain conditions fail, including if the specified account is not underwater.

The protocol described herein may create functional money markets for digital assets, such as Ethereum-based assets. Each money market (or pool) has interest rates determined by supply and demand of the underlying digital asset of the money market. As demand to borrow the underlying digital asset grows or when supply of the underlying digital asset decreases, liquidity may be incentivized by increasing interest rates for the money market.

Users may supply digital assets, which may be in the form of digital tokens, to a money market to earn interest without a central party to establish terms. Users who may wish to use, sell, or re-supply digital assets may borrow digital tokens for the digital asset from the corresponding money market using their balances in the protocol as collateral for the borrowing.

Figure 10:
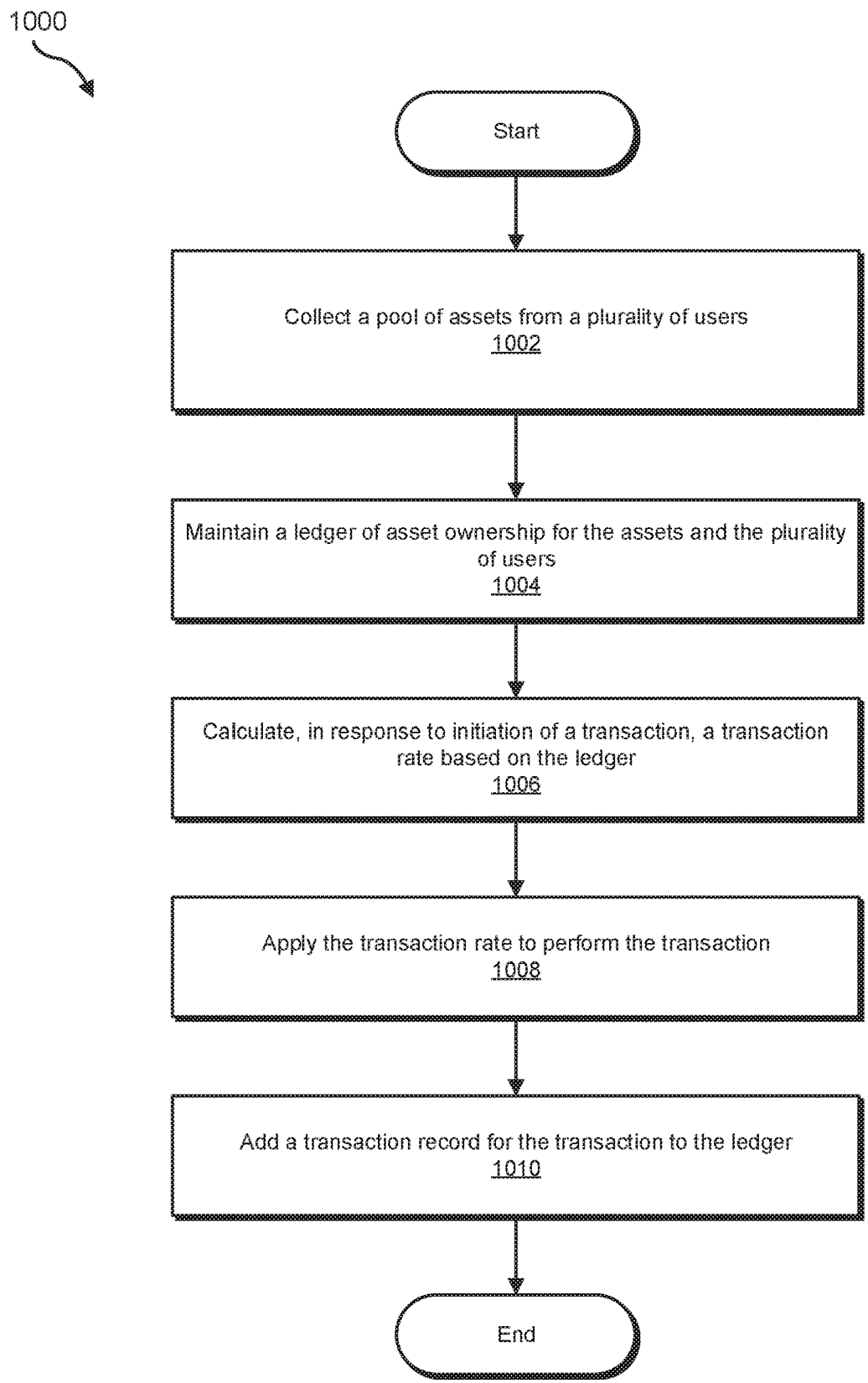
FIG. 10 is a flow diagram of an example method for pooling and transferring digital assets.

Although exemplary embodiments may be implemented on a blockchain network, other implementations may not use blockchains. FIG. 10 is a flow diagram of an example method 1000 for trading digital assets. The steps shown in FIG. 10 may be performed by any suitable computer-executable code and/or computing system, including system 100 in FIG. 1, system 200 in FIG. 2, and/or variations or combinations of one or more of the same. In one example, each of the steps shown in FIG. 10 may represent an algorithm whose structure includes and/or is represented by multiple sub-steps, examples of which will be provided in greater detail below.

As illustrated in FIG. 10, at step 1002 one or more of the systems described herein may collect a pool of assets from a plurality of users. At step 1004 one or more of the systems described herein may maintain a ledger of asset ownership for the assets and the plurality of users. At step 1006 one or more of the systems described herein may calculate, in response to initiation of a transaction, a transaction rate based on the ledger. The transaction rate may be one or more of an interest rate, interest rate index, exchange rate, and/or other values described herein. At step 1008 one or more of the systems described herein may apply the transaction rate to perform the transaction. At step 1010 one or more of the systems described herein may add a transaction record for the transaction to the ledger.

In some examples, the transaction may be canceled. The transaction may fail certain checks and/or conditions. For example, an underlying asset may be insufficient to perform an operation such as a mint operation, or the user may have an insufficient collateral balance for a borrow operation.

Figure 11:
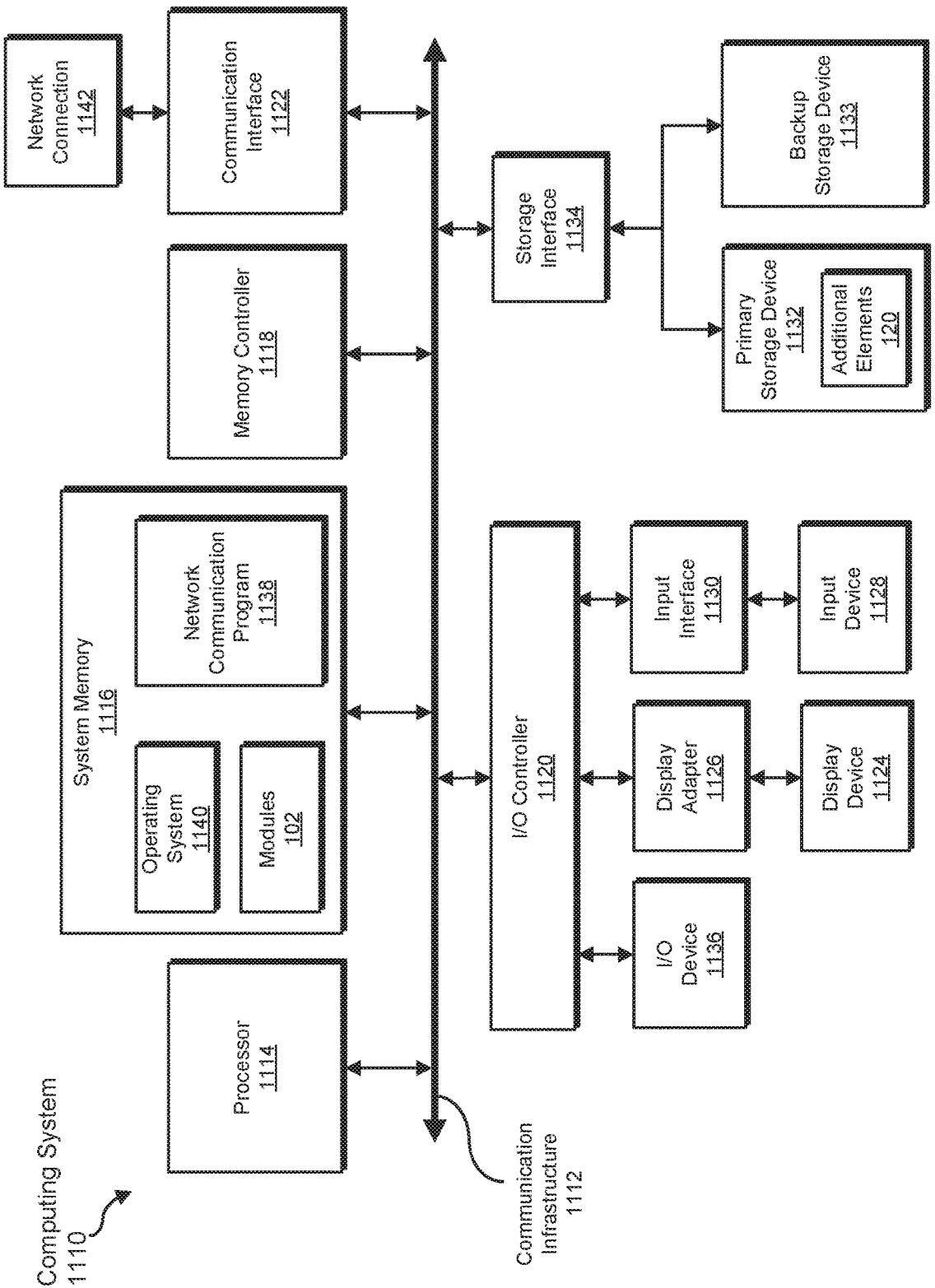
FIG. 11 is a block diagram of an example computing system capable of implementing one or more of the embodiments described and/or illustrated herein.

FIG. 11 is a block diagram of an example computing system 1110 capable of implementing one or more of the embodiments described and/or illustrated herein. For example, all or a portion of computing system 1110 may perform and/or be a means for performing, either alone or in combination with other elements, one or more of the steps described herein (such as one or more of the steps illustrated in FIG. 10). All or a portion of computing system 1110 may also perform and/or be a means for performing any other steps, methods, or processes described and/or illustrated herein.

Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114 and a system memory 1116.

Processor 1114 generally represents any type or form of physical processing unit (e.g., a hardware-implemented central processing unit) capable of processing data or interpreting and executing instructions. In certain embodiments, processor 1114 may receive instructions from a software application or module. These instructions may cause processor 1114 to perform the functions of one or more of the example embodiments described and/or illustrated herein.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below). In one example, one or more of modules 102 from FIG. 1 may be loaded into system memory 1116.

In some examples, system memory 1116 may store and/or load an operating system 1140 for execution by processor 1114. In one example, operating system 1140 may include and/or represent software that manages computer hardware and software resources and/or provides common services to computer programs and/or applications on computing system 1110. Examples of operating system 1140 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 1110 may also include one or more components or elements in addition to processor 1114 and system memory 1116. For example, as illustrated in FIG. 11, computing system 1110 may include a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an Industry Standard Architecture (ISA), Peripheral Component Interconnect (PCI), PCI Express (PCIe), or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134.

As illustrated in FIG. 11, computing system 1110 may also include at least one display device 1124 coupled to I/O controller 1120 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, example computing system 1110 may also include at least one input device 1128 coupled to I/O controller 1120 via an input interface 1130. Input device 1128 generally represents any type or form of input device capable of providing input, either computer or human generated, to example computing system 1110. Examples of input device 1128 include, without limitation, a keyboard, a pointing device, a speech recognition device, variations or combinations of one or more of the same, and/or any other input device.

Additionally or alternatively, example computing system 1110 may include additional I/O devices. For example, example computing system 1110 may include I/O device 1136. In this example, I/O device 1136 may include and/or represent a user interface that facilitates human interaction with computing system 1110. Examples of I/O device 1136 include, without limitation, a computer mouse, a keyboard, a monitor, a printer, a modem, a camera, a scanner, a microphone, a touchscreen device, variations or combinations of one or more of the same, and/or any other I/O device.

Communication interface 1122 broadly represents any type or form of communication device or adapter capable of facilitating communication between example computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution.

In some examples, system memory 1116 may store and/or load a network communication program 1138 for execution by processor 1114. In one example, network communication program 1138 may include and/or represent software that enables computing system 1110 to establish a network connection 1142 with another computing system (not illustrated in FIG. 11) and/or communicate with the other computing system by way of communication interface 1122. In this example, network communication program 1138 may direct the flow of outgoing traffic that is sent to the other computing system via network connection 1142. Additionally or alternatively, network communication program 1138 may direct the processing of incoming traffic that is received from the other computing system via network connection 1142 in connection with processor 1114.

Although not illustrated in this way in FIG. 11, network communication program 1138 may alternatively be stored and/or loaded in communication interface 1122. For example, network communication program 1138 may include and/or represent at least a portion of software and/or firmware that is executed by a processor and/or Application Specific Integrated Circuit (ASIC) incorporated in communication interface 1122.

As illustrated in FIG. 11, example computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a solid state drive, a floppy disk drive, a magnetic tape drive, an optical disk drive, a flash drive, or the like. Storage interface 1134 generally represents any type or form of interface or device for transferring data between storage devices 1132 and 1133 and other components of computing system 1110. In one example, additional elements 120 from FIG. 1 may be stored and/or loaded in primary storage device 1132.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 1110 may be configured as an Application Specific Integrated Circuit (ASIC) adapted to implement one or more of the example embodiments disclosed herein.

Figure 12:
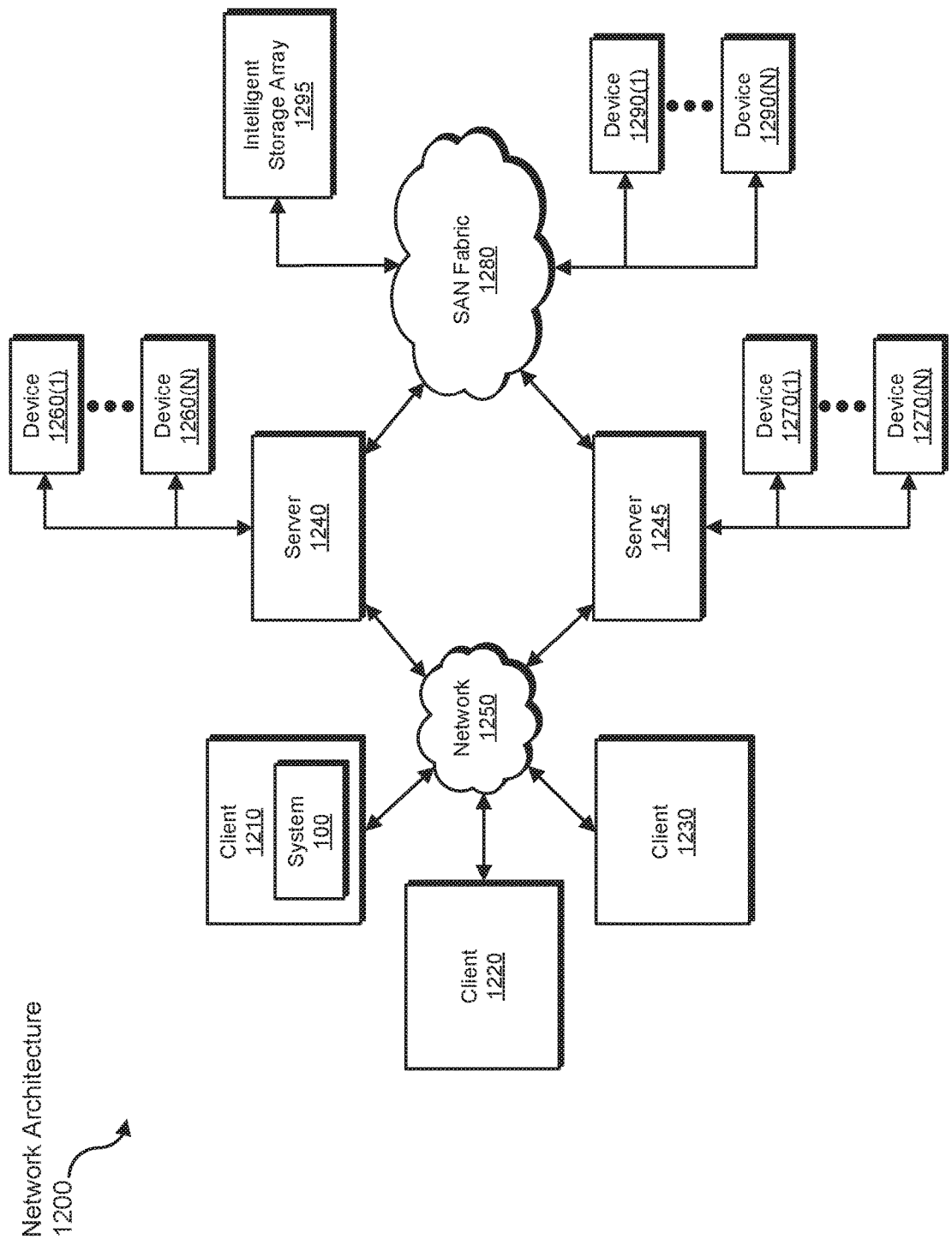
FIG. 12 is a block diagram of an example computing network capable of implementing one or more of the embodiments described and/or illustrated herein.

FIG. 12 is a block diagram of an example network architecture 1200 in which client systems 1210, 1220, and 1230 and servers 1240 and 1245 may be coupled to a network 1250. As detailed above, all or a portion of network architecture 1200 may perform and/or be a means for performing, either alone or in combination with other elements, one or more of the steps disclosed herein (such as one or more of the steps illustrated in FIG. 10). All or a portion of network architecture 1200 may also be used to perform and/or be a means for performing other steps and features set forth in the present disclosure.

Client systems 1210, 1220, and 1230 generally represent any type or form of computing device or system, such as example computing system 1110 in FIG. 11. Similarly, servers 1240 and 1245 generally represent computing devices or systems, such as application servers or database servers, configured to provide various database services and/or run certain software applications. Network 1250 generally represents any telecommunication or computer network including, for example, an intranet, a WAN, a LAN, a PAN, or the Internet. In one example, client systems 1210, 1220, and/or 1230 and/or servers 1240 and/or 1245 may include all or a portion of system 100 from FIG. 1.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent Network-Attached Storage (NAS) devices configured to communicate with servers 1240 and 1245 using various protocols, such as Network File System (NFS), Server Message Block (SMB), or Common Internet File System (CIFS).

Servers 1240 and 1245 may also be connected to a Storage Area Network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to example computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the example embodiments disclosed herein may also be encoded as a computer program, stored in server 1240, run by server 1245, and distributed to client systems 1210, 1220, and 1230 over network 1250.

As detailed above, computing system 1110 and/or one or more components of network architecture 1200 may perform and/or be a means for performing, either alone or in combination with other elements, one or more steps of an example method for pooling and transferring digital assets.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive transaction data relating to a pool of digital assets to be transformed, transform the transaction data, output a result of the transformation to a blockchain ledger for the pool of digital assets, use the result of the transformation to update values relating to the pool of digital assets, and store the result of the transformation to maintain the blockchain ledger. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method for increasing interoperability of a plurality of independent computer protocols implemented as a plurality of smart contracts on a blockchain network, at least a portion of the method being performed by a computing device comprising at least one processor, the method comprising:
    establishing a pooling computer protocol on the blockchain network as a pooling smart contract, the pooling smart contract comprising automatically enforceable code instructions that are executable through decentralized and distributed network of the blockchain network;
    establishing, through the pooling computer protocol, a pool of blockchain tokens generated from the plurality of independent computer protocols of the plurality of smart contracts, the pool of blockchain tokens comprising a plurality of different types of blockchain tokens, wherein the plurality of independent computer protocols are compliant with a technical standard of the blockchain network wherein the plurality of smart contracts comprises a first smart contract and a second smart contract;
    receiving a first transaction event between a first blockchain address and the pooling smart contract, the first transaction event comprising a transfer of a first amount of a first blockchain token from the first blockchain address to the pooling smart contract as part of the pool of blockchain tokens, wherein the first blockchain token issued from the first smart contract, wherein the transaction event is to be recorded in a blockchain ledger, wherein the blockchain ledger tracks associations between different blockchain addresses and the blockchain tokens in the pool, wherein the pooling computer protocol tracks a cash balance of the pool, a liabilities balance of the pool, and an ownership distribution value that is based on a distribution of account asset balances among the pool, and wherein the blockchain ledger includes:
        a plurality of transaction records for the pool of blockchain tokens, the plurality of transaction records entered through the pooling computer protocol; and
        a plurality of blockchain addresses that have association with the pool of blockchain tokens, wherein each blockchain address is associated with a past transfer of an amount of a blockchain token to the pooling smart contract, wherein each blockchain address is associated with an account corresponding to an account asset balance;
    generating, by the pooling computer protocol, an amount of token of the pooling smart contract, wherein the amount of token is a number of token specified by a reference stored in the pooling smart contract, the reference referring to the first transaction event associated with the first blockchain address, wherein the number of the token is determined based on the first amount of the first blockchain token transferred from the first blockchain address to the pooling smart contract in the first transaction event;
    calculating, using the automatically enforceable code instructions of the pooling smart contract that are stored on the blockchain, a transaction rate, wherein the transaction rate is used by the pooling smart contract to provide a condition for an out-transfer of a borrow amount of the first blockchain token from the pool to a second blockchain address, the condition requiring an increase, according to the transaction rate, in a return amount of the first blockchain token to the pool when the second blockchain address returns the second blockchain token, wherein the return amount is higher than the borrow amount, and wherein the transaction rate is determined based on the cash balance of the pool, the liabilities balance of the pool, and the ownership distribution value;
    transferring the borrow amount of the first blockchain token from the pool to the second blockchain address in a second transaction, wherein the second blockchain address is associated with a past transfer of a second blockchain token to the pooling smart contract, the second blockchain token issued from the second smart contract that is different from the first smart contract;
    updating, using the automatically enforceable code instructions of the pooling smart contract that are stored on the blockchain, the cash balance based on the transaction rate, the first transaction event and the second transaction event;
    increasing, using the automatically enforceable code instructions of the pooling smart contract, the account asset balance associated with the first blockchain address by an increased amount, wherein at least part of the increased amount is generated as a result of a difference between the return amount and the borrow amount in the second transaction that involves the out-transfer of the borrow amount from the pool to the second blockchain address;
    adding, using the automatically enforceable code instructions of the pooling smart contract that are stored on the blockchain, transaction records in the blockchain ledger to reflect the first transaction, the second transaction, and the increased amount in the account asset balance associated with the first blockchain address;

receiving, at the pooling smart contract, a redeem request from the first blockchain address of the first blockchain token of the first amount and the increased amount;

determining that the first blockchain token is held at the second blockchain address;

transferring, instead of the first blockchain token, an amount of the second blockchain token issued from the second smart contract to the first blockchain address, wherein the amount of the second blockchain token is equivalent to the first amount and the increased amount of the first blockchain token, thereby linking interoperability of the first smart contract and the second smart contract.

2. The method of claim 1, wherein the plurality of transaction records includes a record for a mint operation from an account with an asset, and the method further comprises:

transferring the asset from the account to the pool;
increasing the cash balance based on the asset; and
increasing, based on the asset and an exchange rate, an account asset balance associated with the account.

3. The method of claim 2, further comprising canceling the mint operation if the asset is insufficient for the mint operation.

4. The method of claim 1, wherein the plurality of transaction records includes a record for a redeem operation from an account requesting an asset and the method further comprises:

transferring the asset from the pool to the account;
decreasing the cash balance based on the asset; and
decreasing, based on the asset and an exchange rate, an account asset balance associated with the account.

5. The method of claim 4, further comprising canceling the redeem operation if the cash balance falls below a threshold value.

6. The method of claim 1, wherein the liabilities balance is calculated based on subtracting a reserves balance from a sum of the cash balance and a borrowing balance.

7. The method of claim 1, further comprising determining an exchange rate for the pool, wherein the exchange rate is calculated based on subtracting the liabilities balance from the cash balance and dividing the subtraction result by the ownership distribution value.

8. A system for increasing interoperability of a plurality of independent computer protocols implemented as a plurality of smart contracts on a blockchain network, the system comprising:

at least one physical processor;
physical memory comprising computer-executable instructions that, when executed by the physical processor, cause the physical processor to:

establish a pooling computer protocol on the blockchain network as a pooling smart contract, the pooling smart contract comprising automatically enforceable code instructions that are executable through decentralized and distributed network of the blockchain network;

establish, through the pooling computer protocol, a pool of blockchain tokens generated from the plurality of independent computer protocols of the plurality of smart contracts, the pool of blockchain tokens comprising a plurality of different types of blockchain tokens, wherein the plurality of independent computer protocols are compliant with a technical standard of the blockchain network, wherein the plurality of smart contracts comprises a first smart contract and a second smart contract;

receive a first transaction event between a first blockchain address and the pooling smart contract, the first transaction event comprising a transfer of a first amount of a first blockchain token from the first blockchain address to the pooling smart contract as part of the pool of blockchain tokens, wherein the first blockchain token issued from the first smart contract, wherein the transaction event is to be recorded in a blockchain ledger, wherein the blockchain ledger tracks associations between different blockchain addresses and the blockchain tokens in the pool, wherein the pooling computer protocol tracks a cash balance of the pool, a liabilities balance of the pool, and an ownership distribution value that is based on a distribution of account asset balances among the pool, and wherein the blockchain ledger includes:

a plurality of transaction records for the pool of blockchain tokens, the plurality of transaction records entered through the pooling computer protocol; and a plurality of blockchain addresses that have association with the pool of blockchain tokens, wherein each blockchain address is associated with a past transfer of an amount of a blockchain token to the pooling smart contract, wherein each blockchain address is associated with an account corresponding to an account asset balance;

generate, by the pooling computer protocol, an amount of token of the pooling smart contract, wherein the amount of token is a number of token specified by a reference stored in the pooling smart contract, the reference referring to the first transaction event associated with the first blockchain address, wherein the number of the token is determined based on the first amount of the first blockchain token transferred from the first blockchain address to the pooling smart contract in the first transaction event;

calculate, using the automatically enforceable code instructions of the pooling smart contract that are stored on the blockchain, a transaction rate, wherein the transaction rate is used by the pooling smart contract to provide a condition for an out-transfer of a borrow amount of the first blockchain token from the pool to a second blockchain address, the condition requiring an increase, according to the transaction rate, in a return amount of the first blockchain token to the pool when the second blockchain address returns the second blockchain token, wherein the return amount is higher than the borrow amount, and wherein the transaction rate is determined based on the cash balance of the pool, the liabilities balance of the pool, and the ownership distribution value;

transfer the borrow amount of the first blockchain token from the pool to the second blockchain address in a second transaction, wherein the second blockchain address is associated with a past transfer of a second blockchain token to the pooling smart contract, the second blockchain token issued from the second smart contract that is different from the first smart contract;

update, using the automatically enforceable code instructions of the pooling smart contract that are stored on the blockchain, the cash balance based on the transaction rate, the first transaction event and the second transaction event;

increase, using the automatically enforceable code instructions of the pooling smart contract, the account asset balance associated with the first blockchain address by an increased amount, wherein at least part of the increased amount is generated as a result of a difference between the return amount and the borrow amount in the second transaction that involves the out-transfer of the borrow amount from the pool to the second blockchain address;

add, using the automatically enforceable code instructions of the pooling smart contract that are stored on the blockchain, transaction records in the blockchain ledger to reflect the first transaction, the second transaction, and the increased amount in the account asset balance associated with the first blockchain address;

receive, at the pooling smart contract, a redeem request from the first blockchain address of the first blockchain token of the first amount and the increased amount;

determine that the first blockchain token is held at the second blockchain address;

transfer, instead of the first blockchain token, an amount of the second blockchain token issued from the second smart contract to the first blockchain address, wherein the amount of the second blockchain token is equivalent to the first amount and the increased amount of the first blockchain token, thereby linking interoperability of the first smart contract and the second smart contract.

9. The system of claim 8, wherein the plurality of transaction records includes a record for a mint operation from an account with an asset, and the instructions, when executed, further cause the physical processor to:
transfer the asset from the account to the pool;
increase the cash balance based on the asset; and
increase based on the asset and an exchange rate, an account asset balance associated with the account.

10. The system of claim 9, wherein the instructions, when executed, further cause the physical processor to cancel the mint operation if the asset is insufficient for the mint operation.

11. The system of claim 8, wherein the plurality of transaction records includes a record for a redeem operation from an account requesting an asset and the instructions, when executed, further cause the physical processor to:
transfer the asset from the pool to the account;
decrease the cash balance based on the asset; and
decrease, based on the asset and an exchange rate, an account asset balance associated with the account.

12. The system of claim 11, wherein the instructions, when executed, further cause the physical processor to cancel the redeem operation if the cash balance falls below a threshold value.

13. The system of claim 8, wherein the liabilities balance is calculated based on a subtraction of a reserves balance from a sum of the cash balance and a borrowing balance.

14. The system of claim 8, wherein the instructions, when executed, further cause the physical processor to determine an exchange rate for the pool, wherein the exchange rate is calculated based on a subtraction of the liabilities balance from the cash balance and a division of the subtraction result by the ownership distribution value.

15. A non-transitory computer-readable medium comprising one or more computer-executable instructions for increasing interoperability of a plurality of independent computer protocols implemented as a plurality of smart contracts on a blockchain network, wherein the computer-executable instructions, when executed by at least one processor of a computing device, cause the computing device to:

establish a pooling computer protocol on the blockchain network as a pooling smart contract, the pooling smart contract comprising automatically enforceable code instructions that are executable through decentralized and distributed network of the blockchain network;

establish, through the pooling computer protocol, a pool of blockchain tokens generated from the plurality of independent computer protocols of the plurality of smart contracts, the pool of blockchain tokens comprising a plurality of different types of blockchain tokens, wherein the plurality of independent computer protocols are compliant with a technical standard of the blockchain network, wherein the plurality of smart contracts comprises a first smart contract and a second smart contract;

receive a first transaction event between a first blockchain address and the pooling smart contract, the first transaction event comprising a transfer of a first amount of a first blockchain token from the first blockchain address to the pooling smart contract as part of the pool of blockchain tokens, wherein the first blockchain token issued from the first smart contract, wherein the transaction event is to be recorded in a blockchain ledger, wherein the blockchain ledger tracks associations between different blockchain addresses and the blockchain tokens in the pool, wherein the pooling computer protocol tracks a cash balance of the pool, a liabilities balance of the pool, and an ownership distribution value that is based on a distribution of account asset balances among the pool, and wherein the blockchain ledger includes:
a plurality of transaction records for the pool of blockchain tokens, the plurality of transaction records entered through the pooling computer protocol; and
a plurality of blockchain addresses that have association with the pool of blockchain tokens, wherein each blockchain address is associated with a past transfer of an amount of a blockchain token to the pooling smart contract, wherein each blockchain address is associated with an account corresponding to an account asset balance;

generate, by the pooling computer protocol, an amount of token of the pooling smart contract, wherein the amount of token is a number of token specified by a reference stored in the pooling smart contract, the reference referring to the first transaction event associated with the first blockchain address, wherein the number of the token is determined based on the first amount of the first blockchain token transferred from the first blockchain address to the pooling smart contract in the first transaction event;

calculate, using the automatically enforceable code instructions of the pooling smart contract that are stored on the blockchain, a transaction rate, wherein the transaction rate is used by the pooling smart contract to provide a condition for an out-transfer of a borrow amount of the first blockchain token from the pool to a second blockchain address, the condition requiring an increase, according to the transaction rate, in a return amount of the first blockchain token to the pool when the second blockchain address returns the second blockchain token, wherein the return amount is higher than the borrow amount, and wherein the transaction rate is determined based on the cash balance of the pool, the liabilities balance of the pool, and the ownership distribution value;

transfer the borrow amount of the first blockchain token from the pool to the second blockchain address in a second transaction, wherein the second blockchain address is associated with a past transfer of a second blockchain token to the pooling smart contract, the second blockchain token issued from the second smart contract that is different from the first smart contract;

update, using the automatically enforceable code instructions of the pooling smart contract that are stored on the blockchain, the cash balance based on the transaction rate, the first transaction event and the second transaction event;

increase, using the automatically enforceable code instructions of the pooling smart contract, the account asset balance associated with the first blockchain address by an increased amount, wherein at least part of the increased amount is generated as a result of a difference between the return amount and the borrow amount in the second transaction that involves the out-transfer of the borrow amount from the pool to the second blockchain address;

add, using the automatically enforceable code instructions of the pooling smart contract that are stored on the blockchain, transaction records in the blockchain ledger to reflect the first transaction, the second transaction, and the increased amount in the account asset balance associated with the first blockchain address;

receive, at the pooling smart contract, a redeem request from the first blockchain address of the first blockchain token of the first amount and the increased amount;

determine that the first blockchain token is held at the second blockchain address;

transfer, instead of the first blockchain token, an amount of the second blockchain token issued from the second smart contract to the first blockchain address, wherein the amount of the second blockchain token is equivalent to the first amount and the increased amount of the first blockchain token, thereby linking interoperability of the first smart contract and the second smart contract.

16. The non-transitory computer-readable medium of claim 15, wherein the plurality of transaction records includes a record for a mint operation from an account with an asset, and the instructions, when executed, further cause the computing device to:
transfer the asset from the account to the pool;
increase the cash balance based on the asset; and
increase, based on the asset and an exchange rate, an account asset balance associated with the account.

17. The non-transitory computer-readable medium of claim 15, wherein the plurality of transaction records includes a record for a redeem operation from an account requesting an asset and the instructions, when executed, further cause the computing device to:
transfer the asset from the pool to the account;
decrease the cash balance based on the asset; and
decrease, based on the asset and an exchange rate, an account asset balance associated with the account.

18. The non-transitory computer-readable medium of claim 17, wherein the instructions, when executed, further cause the computing device to cancel the redeem operation if the cash balance falls below a threshold value.

19. The non-transitory computer-readable medium of claim 15, wherein the liabilities balance is calculated based on a subtraction of a reserves balance from a sum of the cash balance and a borrowing balance.

20. The non-transitory computer-readable medium of claim 15, wherein the instructions, when executed, further cause the computing device to determine an exchange rate for the pool, wherein the exchange rate is calculated based on a subtraction of the liabilities balance from the cash balance and a division of the subtraction result by the ownership distribution value.

* * * * *